(12) United States Patent
Stevens et al.

(10) Patent No.: US 11,531,204 B2
(45) Date of Patent: *Dec. 20, 2022

(54) RELATING TO VARIABLE FOCUSING POWER OPTICAL DEVICES AND AN AUGMENTED REALITY HEADSET OR HELMET INCORPORATING SUCH A DEVICE

(71) Applicant: ADLENS LIMITED, Eynsham (GB)

(72) Inventors: Robert Edward Stevens, Eynsham (GB); Simon Peter Horrocks, Eynsham (GB); Thomas Norman Llyn Jacoby, Eynsham (GB)

(73) Assignee: ADLENS LIMITED, Eynsham (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/365,117

(22) Filed: Jul. 1, 2021

(65) Prior Publication Data

US 2021/0405373 A1 Dec. 30, 2021

Related U.S. Application Data

(63) Continuation of application No. 16/962,997, filed as application No. PCT/GB2019/050106 on Jan. 15, 2019, now Pat. No. 11,086,132.

(30) Foreign Application Priority Data

Jan. 19, 2018 (GB) ...................................... 1800930
Feb. 6, 2018 (GB) ...................................... 1801905

(51) Int. Cl.
*G02B 27/01* (2006.01)
*G02B 3/14* (2006.01)
(Continued)

(52) U.S. Cl.
CPC .......... *G02B 27/0172* (2013.01); *G02B 3/14* (2013.01); *G02B 27/0093* (2013.01); *G02C 7/085* (2013.01); *G02B 2027/0178* (2013.01)

(58) Field of Classification Search
CPC .... G02B 26/004; G02B 27/0172; G02B 3/14; G02B 2027/0178; G02B 27/0081; G02B 2027/0185; G02B 27/0093; G02C 7/085
See application file for complete search history.

(56) References Cited

U.S. PATENT DOCUMENTS 5,731,909 A 3/1998 Schachar
7,619,837 B2 11/2009 Choi et al.
(Continued)

FOREIGN PATENT DOCUMENTS

JP H10144975 A 5/1998
TW I595672 B 8/2017
(Continued)

OTHER PUBLICATIONS

Search Report for GB application No. 1801905.9 dated Aug. 7, 2018, 6 pages.
(Continued)

*Primary Examiner* — Nelson M Rosario
(74) *Attorney, Agent, or Firm* — Rothwell, Figg, Ernst & Manbeck, P.C.

(57) ABSTRACT

A membrane assembly 150 for a variable focusing power optical assembly 100 is disclosed. The membrane assembly 150 comprises a distensible membrane 155 that is held under tension around its periphery (boundary B) by at least one bendable support ring 159 and one or more bending actuators 170, each comprising a selectively operable self-bending strip, which are attached contiguously to respective discrete sections of the support ring 159 for actively controlling the curvature of those sections of the support ring
(Continued)

159. Also disclosed is a variable focusing power optical assembly 100 comprising such a membrane assembly 150. Further disclosed is an article of eyewear 80 comprising at least one such variable focusing power optical assembly 801.

22 Claims, 25 Drawing Sheets

(51) Int. Cl.
  *G02B 27/00* (2006.01)
  *G02C 7/08* (2006.01)

(56) References Cited

U.S. PATENT DOCUMENTS

| | | |
|---|---|---|
| 9,442,285 B2 | 9/2016 | Rogers |
| 2002/0044327 A1 | 4/2002 | Fujita et al. |
| 2008/0239503 A1 | 10/2008 | Conradi et al. |
| 2010/0182703 A1 | 7/2010 | Bolis |
| 2010/0208357 A1 | 8/2010 | Batchko et al. |
| 2011/0267703 A1 | 11/2011 | Batchko et al. |
| 2013/0114148 A1 | 5/2013 | Aschwanden et al. |
| 2015/0241196 A1 | 8/2015 | Gerson |
| 2016/0004099 A1 | 1/2016 | Stevens et al. |
| 2016/0011393 A1 | 1/2016 | Kim et al. |
| 2017/0184848 A1 | 6/2017 | Vallius |
| 2018/0335649 A1* | 11/2018 | Tsai .................. G02B 7/28 |
| 2020/0285062 A1 | 9/2020 | Grutman et al. |

FOREIGN PATENT DOCUMENTS

| | | |
|---|---|---|
| WO | 2013144533 A1 | 10/2013 |
| WO | 2013144592 A1 | 10/2013 |

OTHER PUBLICATIONS

International Search Report for PCT/GB2019/050106 dated Jun. 3, 2019, 5 pages.
Notice of Allowance for Taiwan Application No. 108101936 dated Jun. 24, 2022, 6 pages (with English translation).

* cited by examiner (Unactuated)

(Actuated)

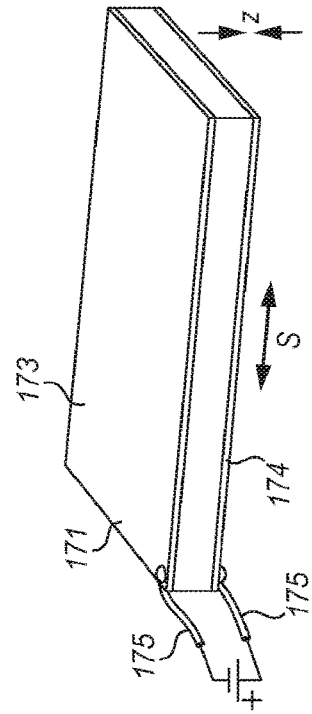
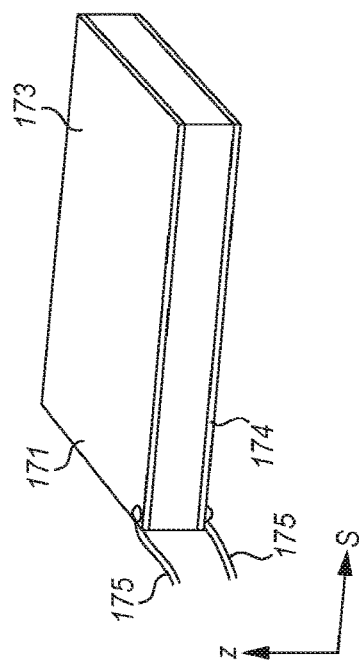
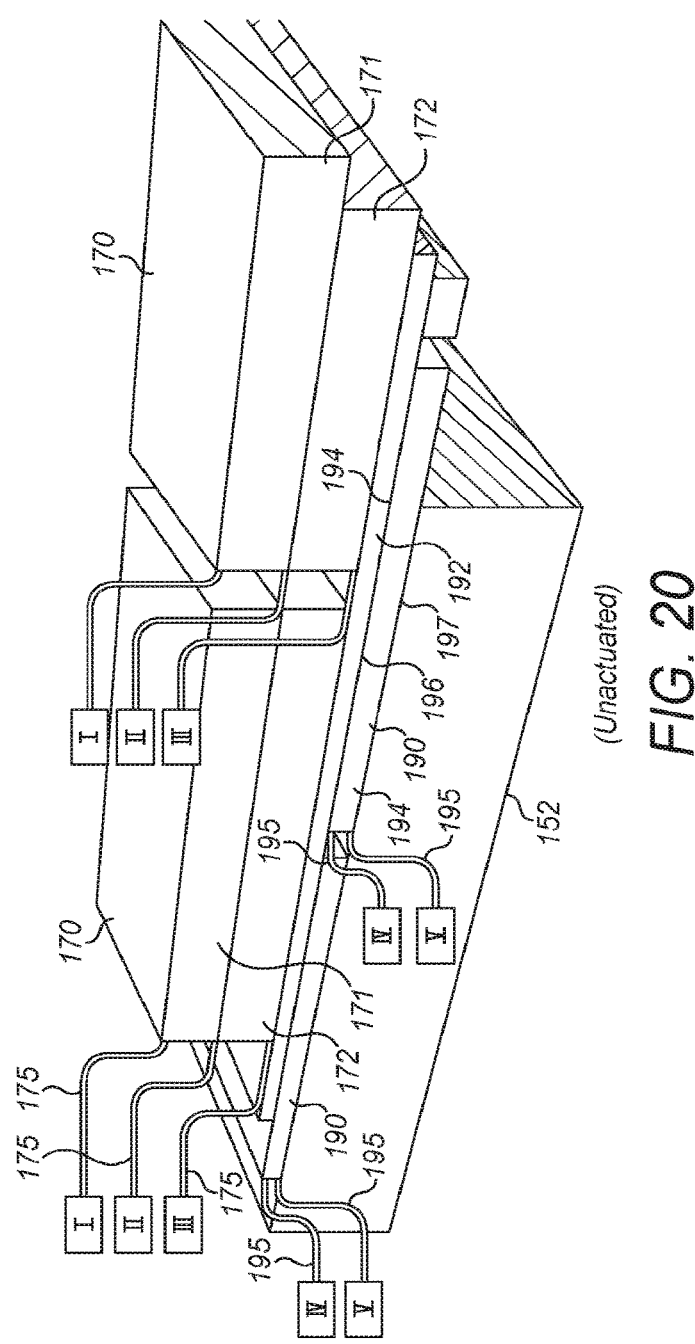

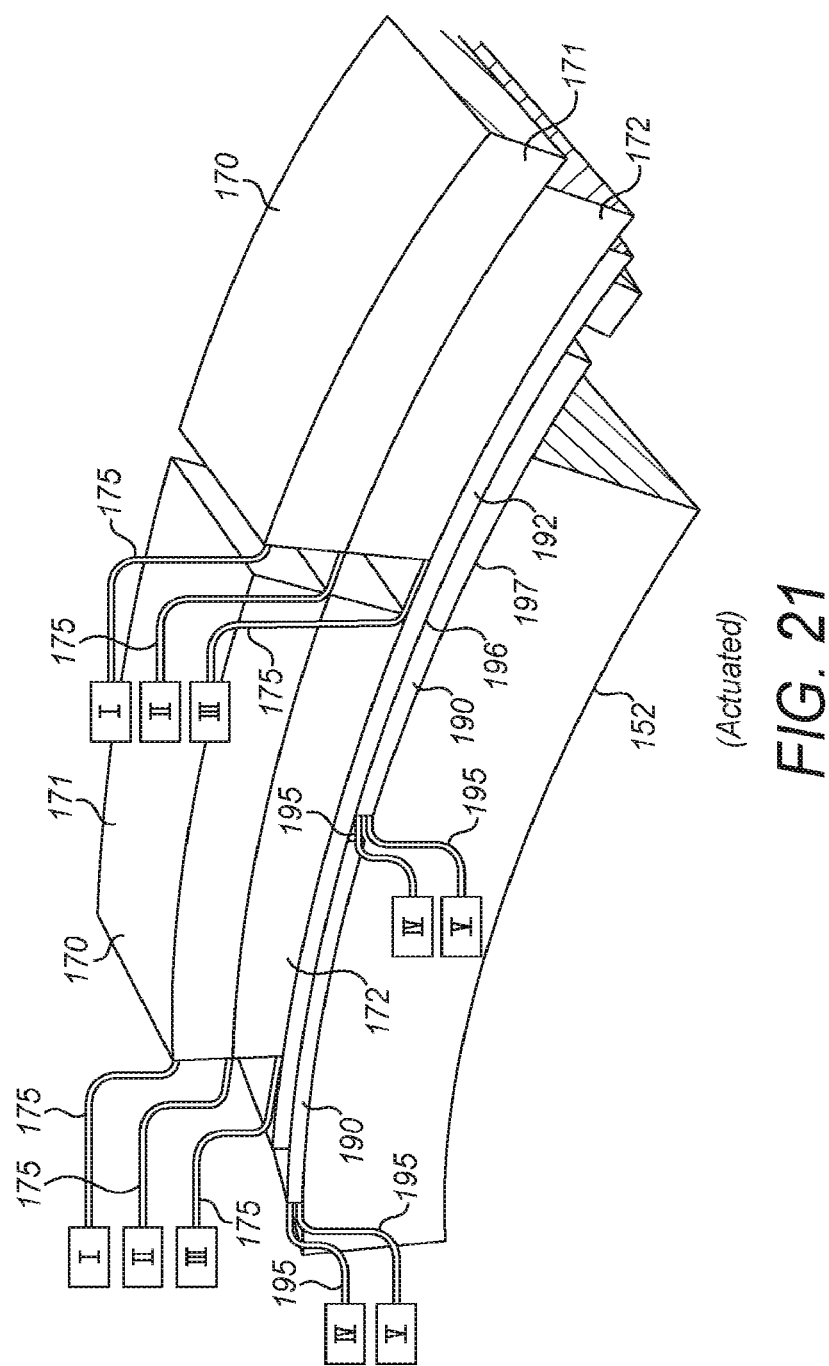
FIG. 21 (Actuated)

(Unactuated)

C:C
(Unactuated)

(Actuated)

C:C
(Actuated)

RELATING TO VARIABLE FOCUSING POWER OPTICAL DEVICES AND AN AUGMENTED REALITY HEADSET OR HELMET INCORPORATING SUCH A DEVICE

PRIORITY

This application is a continuation of U.S. patent application Ser. No. 16/962,997, filed on Jul. 17, 2020, which is a national stage application, filed under 35 U.S.C. § 371, of International Application No. PCT/GB2019/050106, filed on Jan. 15, 2019, which claims the benefit of, and priority to United Kingdom patent application no. 1800930.8, which was filed 19 Jan. 2018 and United Kingdom patent application no. 1801905.9, which was filed 6 Feb. 2018, the contents of which are incorporated herein by reference in their entireties.

FIELD OF THE INVENTION

The present invention relates to variable focusing power optical devices such as variable focusing power lenses and mirrors and has particular reference to variable focusing power optical devices of the kind having an optical surface on a tensioned distensible membrane that is held around its periphery by a bendable support ring. The membrane forms one wall of a fluid-filled envelope that is compressible or expandable to cause the membrane to distend outwardly or inwardly, thereby changing the focusing power of the optical surface. The invention also relates to a membrane assembly comprising such a distensible membrane for use in devices of the this kind, eyewear comprising one or more such variable focusing power lenses and an augmented reality headset or helmet comprising two or more such variable focusing power lenses arranged one in front of the other in optical alignment with a transparent waveguide display disposed therebetween.

BACKGROUND TO THE INVENTION

Fluid-filled variable focus lenses ("liquid lenses") are known in the art and may be of the "compression" or "injection" type.

A typical compression-type lens is disclosed by WO 99/061940 A1 in which a sealed envelope having opposing walls formed by a transparent wall member and a distensible membrane respectively is filled with a transparent liquid, and means are provided for changing the spacing between the transparent wall member and the distensible membrane for varying the pressure of the transparent liquid in the chamber. The membrane is bonded under tension to a retainer and the transparent wall member is supported on a surface of a hard lens that is arranged exteriorly of the envelope, abutting the transparent wall member. A "circularising" membrane support of any desired peripheral shape having a central portion with a circular opening is also provided to ensure that a free area of the membrane is circular, even at maximum distension.

An advantage of a compression-type lens is that it lends itself to the use of a bendable support ring for holding the distensible membrane around its edge, as disclosed, for example, in WO 2013/144533 A1 and WO 2013/144592 A1, the contents of which are incorporated herein by reference. A bendable support ring allows the profile of the edge of the membrane to be adjusted by bending in a direction parallel to an optical axis of the membrane and tangential to the edge of the membrane as the membrane distends or contracts when the shape of the membrane is non-round or if it is required to give the membrane a more complex, 3-dimensional form defined by one or more Zernike polynomials (e.g. cylinder), for example for use in ophthalmic applications.

The compression lens of WO 2013/144592 A1 comprises a support ring that is coupled to a two-part housing which serves to contain the various parts of the lens assembly. The support ring is connected to the housing at a plurality of control points around the support ring by respective engaging members for controlling the position of the edge of the membrane relative to an opposing wall of a dish-shaped part which forms a sealed envelope with the distensible membrane that is held by the support ring. The wall of the dish-shaped part is bonded to a surface of a plate that is attached to the housing. The support ring is unconstrained between the control points. The control points comprise hinge points, where the support ring is hinged by the respective engaging member to the housing, and actuation points, where a pressure adjuster is connected to the support ring by the respective engaging member for controlled displacement of the support ring relative to the wall for adjusting the pressure in the liquid-filled chamber. As disclosed by WO 2013/144592 A1, there may be at least one actuation point and three or more hinge points.

Whilst the compression lens of WO 2013/144592 A1 operates satisfactorily and allows the entire surface of the membrane to be used as an optical surface without the need for a circularising support, it suffers from the disadvantage that bending of the support ring is passive between the control points. The support ring is held stationary relative to the housing at the hinge points and is actively displaced relative to the wall of the dish-shaped part at the actuation points for bending the support ring. Distension of the membrane into the correct 3D form depends on passive bending of the support ring between control points. This may be difficult to achieve in practice, especially in regions of the support ring that are remote from an actuation point.

U.S. Pat. No. 5,731,909 A discloses a method for increasing the optical power of an elastically deformed lens by making small changes in the equatorial diameter of the lens. In this arrangement, the curvature of a periphery of a circular synthetic elastically deformable transparent refracting body is adjusted in an (x,y)-plane that is normal to an optical axis of the lens.

US 2011/0267703 A1 discloses a round fluidic lens having a reservoir that is at least partially bounded by a first optical surface and a second optical surface. A fluid fills a volume of the reservoir. A piston is configured to contact a portion of the first or second optical surface from outside the reservoir. One or more of the first optical surface or second optical surface is configured to deform as a result of a change in a pressure applied to the fluid or a change in contact between the piston and the first or second optical surface. A rim may be disposed outside the reservoir and configured to contact and provide additional deformation to one or more of the first or second optical surface. In this arrangement, there is no change in the curvature of an edge of the first or second optical surface.

US 2010/0182703 A1 discloses an optical device with a circular deformable membrane including an anchoring area on a support helping to contain a constant volume of liquid in contact with one of its faces, a substantially central area, configured to be deformed reversibly from a rest position, and an actuation mechanism displacing the liquid in the central area, stressing the membrane in parts situated between the central area and the anchoring area. The actuation mechanism includes plural thermal or piezoelectric actuators of micro-beam type, distributed at the periphery of the membrane, the micro-beams including at least one fixed part joined to the support and a least one moving part coming into contact, on an actuation, with the membrane in an area situated between the central area and the anchoring area.

JP 10-144975 A discloses a laminated piezoelectric actuator used as a drive mechanism for a round variable focal lens apparatus having a sealed space formed by a transparent plate and an opposing transparent plastic film which is filled with a working fluid. The actuator comprises several laminated piezoelectric bimorphs having a through-hole in a centre part, an outer-periphery part and an inner-periphery part that are connected by an outer-periphery connecting member and an inner-periphery connecting member. The transparent elastic film is coaxial to the through-hole and is connected to the outer-periphery connecting member of the actuator. The transparent plate is connected to the inner-periphery connecting member. Upon application of an AC voltage to the actuator, the transparent elastic film is vibrated, owing to pressure fluctuation of the working fluid.

Upon actuation, the piezoelectric actuators of US 2010/0182703 A1 and piezoelectric bimorphs of JP 10-144975 A both bend in a plane that is parallel to an optical axis of the optical device or lens apparatus respectively and normal to the periphery of the membrane or transparent elastic film. The actuators/bimorphs do not bend in a direction tangential to the periphery of the membrane or transparent elastic film.

US 2008/023953 A1 discloses a projection objective of a micro-lithographic projection exposure apparatus which comprises a manipulator for reducing rotationally asymmetric image errors. The manipulator in turn contains a lens, an optical element and an interspace formed between the lens and the optical element, which can be filled with a liquid. At least one actuator acting exclusively on the lens is furthermore provided, which can generate a rotationally asymmetric deformation of the lens. In one embodiment of US 2008/023953 A1, the manipulator comprises eight actuator layers, each formed by a piezoelectric element, that solely rest on a lower optical surface of a bendable plane-parallel circular plate and are arranged close to a circumference of the plate to form a ring interrupted by slit-like gaps or a quasi-continuous actuator ring. The crystals of the piezoelectric elements are aligned such that, upon application of electrical voltage, tensile or compressive forces are produced by the actuator layers along a tangential direction. The directions of the forces extend in a plane that is perpendicular to an optical axis. Since the actuator layers are arranged only on one side of the plate, there will be an asymmetric force distribution within the plate which causes its bending.

A first object of the present invention is to provide improved control over the curvature of the support ring in a compression-type variable focusing power optical device such as a lens between control points.

Another disadvantage associated with a compression-type lenses of the kind disclosed by WO 2013/144592 A1 for example, is that attachment of the support ring to a housing by engaging members at control points results in a relatively bulky assembly.

Another object of the present invention therefore is to provide a variable focusing power optical assembly that is as small and light as possible, especially when it is an adjustable lens for use in eyewear that is designated to be worn on a user's face.

One application for adjustable lenses is in the field of head-up displays (HUD) and helmet-mounted displays, as disclosed for example in EP 3091740 A1 in which a binocular display device comprises two ocular assemblies to be worn by a user concurrently with one respective ocular assembly at each eye, each ocular assembly comprising an outer optical part having a positive optical strength arranged for receiving external light from an external scene and for directing the result to a transparent waveguide display part of the device that is arranged for outputting substantially collimated display light, and an inner optical part having a negative optical strength arranged for receiving both the external light and the substantially collimated display light from the waveguide display part and for imposing a divergence on the received display light to generate a virtual focal point substantially common to each ocular assembly and outputting the result for display whereby, in use, an image conveyed by the display light is superimposed on the external scene as a three-dimensional image when viewed through the binocular display device. The display device comprises a controller unit arranged to control the optical strength of the two divergent lenses such that the virtual focal point remains substantially common to each ocular assembly, and such that it may vary in position.

A well-known problem associated with augmented and virtual reality headsets and helmets, including HUDs, is accommodation-vergence conflict in which a mismatch between the accommodation and vergence with which a user views a virtual 3D object on a display near the user's eyes can lead to headache, fatigue and/or nausea.

Yet another object of the present invention therefore is to alleviate the problem of vergence-accommodation-conflict (VAC) in an augmented reality headset.

Following is a description of certain aspects of the present invention, each of which address at least one, but not necessarily all simultaneously, of the above-mentioned objects of the invention.

SUMMARY OF THE INVENTION

In a first aspect of the present invention there is provided a membrane assembly for a variable focusing power optical device comprising a distensible membrane that is held under tension around its periphery by at least one bendable support ring, which is characterised by one or more curvature controllers, the or each curvature controller being attached to a respective discrete section of the support ring for actively controlling the curvature of the respective section of the support ring. In use, the distensible membrane provides an optical surface of variable focusing power which can be adjusted by altering the pressure of a fluid in contact with a surface of the membrane. The membrane has a three-dimensional distended shape that is suitable for optical or ophthalmic use. Thus, the three-dimensional distended shape of the membrane may be spherical or a composite shape that is defined by one or more first, second, third or fourth order Zernike polynomials. Suitably a primary spherical component (4) may be superposed by one or more secondary components that are defined by other selected second, third and/or fourth order Zernike polynomials, to introduce one or more deviations from the basic spherical form that are selected from astigmatism, coma and trefoil and afford the usual range of lens shapes required by an optometrist. The one or more curvature controllers are arranged to adjust the shape of the periphery of the membrane in accordance with the three-dimensional distended shape of the membrane.

The support ring may have a circumference in the range of about 100-200 mm, suitably about 125-175 mm. A single support ring may be provided. Alternatively, two or more support rings may be provided that are laminated together to form a composite support ring. The support rings may have substantially the same shape as one another. In some embodiments, the membrane may be sandwiched between two adjacent support rings.

Suitably, the support ring(s) may be resiliently bendable. Suitable resilient materials include steel, titanium, glass and sapphire. In some embodiments, the or each support ring may be stamped from a sheet of stainless steel.

Suitably, the or each support ring may have two opposite flat surfaces that are substantially parallel to an (x,y)-plane defined by the membrane when flat, i.e. when it is undeformed and the optical surface is at zero optical power. It will be appreciated that when incorporated in an optical assembly such for example as a variable focusing power lens or mirror or other optical device, the optical assembly may be set up such that the membrane is never allowed to go flat; for example, it may have a minimum curvature in the device. However, it will be understood that the membrane can still be thought of as having a theoretical planar, undeformed state which defines the (x,y)-plane. Likewise, the or each support ring will define the (x,y)-plane when it is flat, even if in a complete optical assembly it is arranged never to go completely flat. References herein to the (x,y)-plane mean a plane defined by the membrane and/or support ring when they are undeformed and flat.

The or each support ring may be a generally rectangular cross-section. The or each support ring may have a width in the (x,y)-plane of less than about 2-3 mm, preferably no more than 1 mm. The support rings may have the same or different thickness on a z-axis that is normal to the (x,y)-plane. In some embodiments, the support rings may each have a thickness in the range of about 0.1 mm to about 0.5 mm. The overall thickness on the z-axis of a single support ring or a composite support ring may suitably be in the range about 0.4 mm to about 0.7 mm.

The one or more curvature controllers may be arranged for controlling the curvature of the support ring in a direction that is generally perpendicular to the (x,y)-plane defined by the membrane. In particular, the one or more curvature controllers may be arranged for controlling the curvature of the support ring in a plane that is orthogonal to the direction of attachment of the membrane to the support ring and tangential to the support ring. Accordingly, each of the one or more curvature controllers may be arranged for causing the support ring to bend in a direction substantially parallel to the z-axis and tangential to the periphery of the membrane. When incorporated in a lens, mirror or other optical assembly having an optical axis, the z-axis may be coincident or substantially aligned with the optical axis, such that the each of the one or more curvature controllers may be arranged for causing the support ring to bend in a direction substantially parallel to the optical axis of the assembly and tangential to the periphery of the membrane.

By a "curvature controller" herein is meant a device that is carried on a region of the support ring for actively bending the support ring locally in that region. A curvature controller may be of finite length; it may extend only along the region of the support ring, i.e. it may extend only round part of the support ring. In some embodiments, two or more curvature controllers may be connected together in a continuous end to end arrangement. For example, a plurality of curvature controllers may be formed as a single continuous part, with each curvature controller being individually controllable and acting on a respective corresponding region of the support ring. The or each curvature controller should be capable of developing a power of the order of mJ in 0.1 s. The or each curvature controller should therefore have a power rating in the range about 1-100 mW, suitably 1-20 mW, e.g. about 10 mW.

A curvature controller may be laminated or attached to the region of the support ring or to an intervening element that is itself attached to the support ring, and may be operable to bend such that bending of the curvature controller is imparted to the region of the support ring. Alternatively, as detailed below, a curvature controller may be attached to a region of the support ring of finite length at two or more spaced locations in the region—typically at each end of the region—and arranged to apply a bending moment to the support ring between those locations, again to cause bending the support ring. The curvature controller may suitably be mounted on one of the flat surfaces of the support ring(s). Suitably the curvature controller may be accommodated within the dimensions of the support ring. In some embodiments, the curvature controller may have a width in the (x,y)-plane of no more than about 2 mm, preferably no more than about 1 mm. Suitably, the curvature controller should not protrude beyond the edges of the support ring, especially an inner edge of the support ring where it is attached to the membrane.

Generally, a curvature controller is not arranged for the transmission of a physical force to or from any other part of the membrane assembly or another assembly, such for example as a variable focusing power optical assembly, in which the membrane assembly may be incorporated, as described below, but acts wholly on the support ring. By acting on a continuous region of the support ring, a curvature controller is distinguished, for example, from a boundary height controller of the kind that is connected to a single point on a support ring and to another part of a variable focusing power optical assembly in which the support ring is included for actively displacing the support ring towards or away from the other part at that point (which may also result in passive bending of the support ring).

Suitably, the or each curvature controller may comprise a bending actuator that is formed on or mounted to the respective discrete section of the support ring. By a "bending actuator" is meant an actuator that bends itself, such that when formed on or mounted to another bendable part such, for example, as the support ring, it is operable to impart corresponding bending to that part. The bending actuator may be formed or mounted on one of the flat surfaces of the support ring(s) as mentioned above. The bending actuator may bend in a direction substantially that is parallel to the z-axis and tangential to the periphery—or boundary—of the membrane.

Examples of suitable bending actuators include one more strips of a piezoelectric, electroactive or magnetostrictive material or bimetallic strips. For instance, in some embodiments, at least one of the one or more bending actuators may comprise a piezoelectric bimorph or multilayer actuator which consists of two or more layers of piezoelectric material that are laminated to one another and arranged such that the application of different electrical fields across the layers, typically using electrodes, causes bending of the actuator and local bending of the support ring adjacent the actuator as a result. As described above, in some embodiments, the or each bending controller may comprise a separate part that is attached to its corresponding region of the support ring. Alternatively, a single piezoelectric actuator may extend across multiple regions, or even the whole way round the support rings, with a plurality of discontinuous electrodes defining separate bending actuators for the different regions of the support ring to be controlled. Thus, separate sections of the piezoelectric actuator that are associated with respective corresponding regions of the support ring may be controlled individually.

Advantageously, the or each bending actuator may comprise a plurality of layers of piezoelectric material that are attached to the support ring. Such an arrangement may afford the requisite bending force needed for bending the support ring against its own intrinsic elasticity and restoring forces acting on the support ring from the tensioned membrane, without subjecting each individual layer of piezoelectric material to excessive tensile strain.

A piezoelectric bimorph or multilayer bending actuator may be formed on the support ring by inkjet printing successive layers of piezoelectric material onto the support ring or an intermediate layer attached to the support ring. Alternatively, a bimorph or multilayer piezoelectric bending actuator may be attached to the support ring or an intermediate layer intermediate support ring using a suitable adhesive or by other suitable means.

In some embodiments, the or each curvature controller may comprise a linear actuator that is connected to the support ring at two locations that are spaced apart along the ring such that operation of the linear actuator causes the support ring to bend between the two locations. Examples of suitable linear actuators include pistons, SMA wires or wire arrays, electroactive polymer actuators, piezoelectric squiggle motors and solenoids.

In some embodiments, two or more curvature controllers may be attached to different respective sections of the support ring.

In some embodiments, the membrane assembly may further comprise at least one curvature sensor for measuring the local curvature of a discrete section of the ring. A suitable curvature sensor may comprise at least one layer of piezoelectric material that is attached to the support ring.

Where the membrane assembly comprises a piston as a linear actuator for controlling the curvature of a discrete section of the support ring, the curvature sensor may comprise an extension sensor associated with the piston.

In some embodiments, the membrane assembly may comprise a plurality of curvature controllers formed on or mounted to different respective sections of the support ring and two or more curvature sensors, each of which is associated with a different respective one of the curvature controllers for measuring the local curvature of the support ring near the respective curvature controller.

The number of curvature controllers and their placement around the support ring may vary according to the shape and size of the membrane and on its desired distended three-dimensional form as described in more detail below. A single curvature controller should not extend around the entire support ring, but should cover only a discrete part of the support ring, but as noted above a plurality of adjacent curvature controllers may be provided by a single, continuous part.

The length of the or each curvature controller should be sufficiently long to produce a sufficient bending moment to cause local bending of the region of the support ring without requiring undue energy, but should not be so long as to impair the accuracy of the shape of the support ring that is required to produce distension of the membrane to the desired three-dimensional form. For instance, one or more curvature controllers of relatively short length may be placed around regions of the support ring of greater curvature in the plane of the ring, while fewer and/or longer curvature controllers may be placed in regions of the support ring of lower curvature, for example regions of the support ring that are straight or nearly straight in the plane of the ring. The person skilled in the art will be able to adapt the precise number, size and location of the one or more curvature controllers for each specific membrane assembly that is constructed in accordance with the invention.

In some embodiments, the membrane may be non-round. However, this does not exclude the possibility that in some embodiments, the membrane may be substantially circular. In general, for eyewear applications, the membrane may have any shape that is suitable from an aesthetic as well as practical point of view. Typical lens shapes for eyewear include oval, semi-oval, rectangular, wayfarer, aviator, navigator, half-eye, cat-eye, semi-cat-eye, octagon, hexagon, pentagon and semi-square. In some embodiments, the membrane may have a generally rectangular shape. The support ring(s) that hold the membrane around its edge may have a corresponding shape.

In accordance with the present invention, therefore, support ring may have a curvature ($1/R_{xy}$) that varies in the (x,y)-plane. Curvature controllers may be attached to the support ring in regions of the greatest curvature. A non-round support ring may carry a plurality of curvature controllers in accordance with the invention with more curvature controllers being located in regions of greater curvature than in regions of lower curvature. The curvature controllers positioned in regions of relatively high curvature may be shorter than curvature controllers positioned in regions of relatively low curvature. In some embodiments, the number density of curvature controllers may be greater in regions of greater curvature as compared with the number density of curvature controllers in regions of lower curvature.

In some embodiments, the membrane may be optically clear. Such a membrane assembly may be suitable for incorporation in a variable focusing power lens.

According to a second aspect of the present invention there is provided a variable focusing power optical assembly comprising a membrane assembly in accordance with the first aspect of the invention. As mentioned above, the variable focusing power optical assembly may define an optical axis, and the z-axis as defined above may be coincident or substantially aligned with the optical axis.

The variable focusing power optical assembly may, for example, constitute a variable focusing power mirror or lens. A variable focusing power lens in accordance with the invention may be incorporated in eyewear for human use such, for example, as a pair of spectacles or an augmented or virtual reality headset in which at least one variable focusing power lens is arranged in the field of view of a user.

According to a third aspect of the present invention, there is provided a variable focusing power optical assembly comprising a compressible fluid-filled envelope having a first wall formed by a distensible membrane that is held under tension around its periphery by at least one bendable support ring, an inflexible second wall opposite the first wall, the support ring being held at a fixed distance from the second wall at three or more hinge points which are spaced apart around the support ring and being bendable towards or away from the second wall intermediate the hinge points, and a side wall between the first and second walls that is collapsible to accommodate such bending, and one or more curvature controllers attached to respective discrete sections of the support ring between the hinge points. The membrane may be arranged to distend in a direction towards or away from the second wall upon bending of the support ring between the hinge points. A surface of the membrane may form an optical surface of variable focusing power owing to such distension of the membrane. The one or more curvature controllers may be operable for actively controlling the curvature of each respective discrete section of the ring in the direction of distension of the membrane.

In some embodiments, the inflexible second wall may be provided by or supported on a rigid body. For making a variable focusing power lens assembly, the inflexible second wall may be a surface of a hard lens. Alternatively, the inflexible second wall may be a wall formed of a flexible material that is bonded or otherwise attached to a rigid body such as a hard lens.

The rigid body may be mounted firmly within a chassis. The chassis may form part of a frame or housing for the variable focusing power optical assembly. For instance, in some embodiments, the chassis may form part of a frame for a pair of glasses or augmented reality or virtual reality helmet or headset. Alternatively, the chassis may form a dedicated housing for the variable focusing power optical assembly which serves to package all the components of the variable focusing power optical assembly as a discrete integral unit. Such a housing may facilitate mounting the variable focusing power optical assembly to a larger assembly such, for example, as a pair of glasses, headset or other optical device.

Conveniently, the support ring may be connected to the chassis at each of the hinge points. In some embodiments, the support ring may comprise a tab at each hinge point which is coupled to the chassis.

In some embodiments, the support ring may be mounted on the rigid body by a support pin disposed at each hinge point. Each support pin may have a first end that engages the support ring and a second end that is fixedly secured to the rigid component.

In some embodiments, the variable focusing power optical assembly may further comprise at least one boundary height controller for actively displacing the support ring at an actuation point towards or away from the second wall. Displacement of the support ring at an actuation point may cause local bending of the support ring in the region of the actuation point. Suitable boundary height controllers include sliding cam actuators, rotating cam actuators, pistons, SMA actuators and piezo-actuators amongst others. The one or more boundary height controllers may be used for compressing and expanding the fluid-filled envelope to change the shape of the membrane and may act in concert with the one or more curvature controllers for controlling the shape of the periphery of the membrane.

Advantageously, the variable focusing power optical assembly may comprise a membrane assembly in accordance with a first aspect of the present invention. It will be understood that the description of the membrane assembly given above in relation to the first aspect of the invention is equally applicable to the corresponding parts of the variable focusing power optical assembly of the third aspect of the present invention. Accordingly, the or each curvature controller may comprise a bending actuator that is attached to the respective discrete section of the support ring. Suitably the bending actuator may comprise at least one strip of a piezoelectric, electroactive or magnetostrictive material and/or at least one bimetallic strip. For example, the bending actuator may comprise a piezoelectric bimorph, a multilayer actuator or a plurality of layers of piezoelectric material that are attached to the respective discrete section of the support ring, as mentioned above. In some embodiments, the or each curvature controller may comprise a linear actuator that is attached to the support ring at two locations that are spaced apart along the ring, such that operation of the linear actuator causes the support ring to bend between the two locations. The linear actuator may comprise a piston, an SMA wire or wire array, an electroactive polymer actuator, a piezoelectric squiggle motor or a solenoid. In some embodiments two or more curvature controllers may be mounted to different respective sections of the support ring.

In some embodiments, the variable focusing power optical assembly may further comprise at least one curvature sensor for measuring the curvature of a discrete section of the support ring and generating an output signal representing the curvature of the discrete section. Suitably the curvature sensor may comprise at least one strip of piezoelectric material that is formed on or attached to the support ring. Where the variable focusing power optical assembly includes a piston as a linear actuator for controlling the curvature of a discrete section of the support ring, the curvature sensor may comprise an extension sensor associated with the piston.

In some embodiments, the variable focusing power optical assembly may comprise a plurality of curvature controllers attached to different respective sections of the support ring and two or more curvature sensors, each of which is associated with a different respective one of the curvature controllers for measuring the local curvature of the corresponding section of the support ring at the respective curvature controller and generating an output signal representing the curvature of the corresponding section.

In some embodiments, the variable focusing power optical assembly of the present invention may further comprise an electronic control system for controlling operation of the one or more curvature controllers. The electronic control system may comprise a processor, a memory containing machine-readable instructions and data relating the curvature of at least one discrete section of the support ring as measured by one or more corresponding curvature sensors to the focusing power of the optical surface formed by the membrane, and an input device operable to generate an input signal representing a value related to a target focusing power. The machine-readable instructions may include instructions for the processor to receive the output signal from the one or more curvature sensors and use the data stored in the memory device to determine a measured focusing power for the optical surface of the membrane, receive the input signal from the input device and determine the target focusing power, compare the measured focusing power of the optical surface with the target focusing power and, if the measured focusing power is different from the target focusing power, to operate the or each curvature controller to change the curvature of the respective discrete section of the support ring. In this way, the focusing power of the optical surface can be adjusted towards to the target focusing power.

Where the variable focusing power optical assembly comprises two or more curvature controllers around the support ring, they may advantageously be individually addressable by the electronic control system.

At least one further sensor may be provided for measuring a physical property of the fluid within the fluid-filled envelope. In such cases, the data stored by the memory device may relate the focusing power of the optical surface to the curvature of the discrete sections of the support ring measured by the one or more curvature sensors and to the physical property of the fluid. The machine-readable instructions may include instructions for the processor to receive a sensor signal from the further sensor and to calculate the measured focusing power of the optical surface from the measured curvature of the discrete section or sections of the support ring and the measured physical property of the fluid. In some embodiments, the measured physical property may be temperature and/or pressure.

In some embodiments, the input device may comprise a user-operable input device for selecting the target focusing power, a range-finding device and/or an eye-tracking device.

In some embodiments, the variable focusing power optical assembly of the invention may further comprise at least one boundary height controller for actively displacing the support ring at an actuation point between two hinge points towards or away from the second wall. Suitably, the data held by the memory device may include data relating the focusing power of the optical surface to the displacement or position of the actuation point as well as the curvature of the one or more discrete sections of the support ring, and the machine-readable instructions may include instructions for the processor to operate the boundary height controller to adjust the displacement or position of the support ring at the actuation point and to operate the or each curvature controller to adjust the curvature of the respective discrete sections of the support ring. In this way, the focusing power of the optical surface can be adjusted towards to the target focusing power.

As with the curvature controllers, where the variable focusing power optical assembly of the invention comprises a plurality of boundary height controllers, they may each be individually addressable by the electronic control system. Alternatively, two or more boundary height controllers may be controlled as a group.

In a fourth aspect of the present invention there is provided variable focusing power optical assembly comprising a compressible fluid-filled envelope having a first wall formed by a distensible membrane having an optical surface, the membrane being held under tension around its periphery by at least one bendable support ring, an inflexible second wall disposed opposite the first, wall which is formed by or supported on a surface of a rigid body, and a collapsible side wall extending between the first and second walls; the support ring being mounted on the rigid body by a plurality of support pins. Each support pin may have a first end that engages the support ring at a respective hinge point and a second end that is fixedly secured to the rigid body. The support ring may thus be held at a fixed distance from the second wall at each hinge point by the corresponding support pin and is bendable towards or away from the second wall intermediate the hinge points. At least one selectively operable pressure adjuster may be provided for adjusting the pressure of the fluid in the envelope to cause the membrane to distend towards or away from the second wall such that the optical surface formed by the membrane is of variable focusing power.

Each support pin may extend between the support ring and the second wall in a direction substantially parallel to the direction of distension of the membrane, i.e. parallel to the z-axis.

The hinge points may all lie on a common plane.

Suitably, the pressure adjuster comprises a boundary height controller which is selectively operable for actively displacing the support ring at an actuation point towards or away from the second wall, thereby causing local bending of the support ring in the vicinity of the actuation point. The boundary height controller may comprise a sliding cam actuator, a rotating cam actuator, a piston, an SMA actuator, a piezo actuator or the like.

In some embodiments, the variable focusing power optical assembly may be a lens assembly. To this end, the membrane, second wall and rigid body may be optically clear. The rigid body may have an optical outer surface having a fixed focusing power that combines with the variable focusing power of the optical surface of the membrane.

In a fifth aspect of the present invention there is provided an article of eyewear comprising at least one variable focusing power optical assembly in accordance with one or more of the second, third or fourth aspects of the invention.

In a sixth aspect of the present invention there is provided an augmented reality headset or helmet comprising two augmented reality display modules, each module comprising at least two variable focusing power lens assemblies in accordance with one or more of the second, third or fourth aspects of the invention that are arranged in optical alignment one in front of the other and a waveguide display interposed therebetween. Suitably the waveguide display is optically clear. The two modules are arranged to be positioned one each in front of a user's right and left eyes when the headset or helmet is worn for displaying a virtual 3-dimensional image to the user while permitting the user to view his or her surroundings in the real world through the lenses and waveguide display.

Each of the variable focusing power lens assemblies may include a hard lens that forms or supports the second inflexible wall and has an optical outer surface of fixed focusing power. The focusing powers of the optical surfaces of the hard lenses of the two variable focusing power optical lens assemblies may be the same or different from one another. In some embodiments, the optical surface of the hard lens of one of the two variable focusing power lens assemblies may have a focusing power of about −1 to −5 dioptres or −2 to −4 dioptres, e.g. about −3 dioptres. The optical surface of the hard lens of the other of the two variable focusing power lens assemblies may have a focusing power of about 0 to −1 dioptres, e.g. about −0.5 dioptres.

Meanwhile, the focusing power of the optical surface of the distensible membrane of each of the two variable focusing power lens assemblies may be adjustable in the range about 0 to +5.0 dioptres, e.g. +0.5 to +3.0 dioptres.

The composite focussing power of the one variable focusing power lens assembly may therefore be adjustable in the range 0 to −5.0 dioptres, e.g. 0 to −2.5 dioptres, while the focusing power of the other variable focusing power lens assembly may be adjustable in the range 0 to +5.0 dioptres, e.g. 0 to +2.5 dioptres.

As is known in the art, the transparent waveguide display may be operable to output substantially collimated display light that conveys an image.

A suitable method of operating the augmented reality display modules is described in detail in co-pending UK patent application no. 1800933.2, the contents of which are incorporated herein by reference.

Briefly, the rear one of the two lens assemblies in each module that is closer to the user's eye may be operated to make its composite focusing power more negative, thereby to displace a virtual focal plane of an image conveyed by light emitted from the waveguide display from infinity to a specific focal length. Meanwhile, the front lens assembly may be operated to increase its composite focusing power to negate the increased negative focusing power of the rear lens assembly, so that the effect on light passing through both lens assemblies of the augmented reality display module is neutral or substantially neutral. In this way, the augmented reality display module may be controlled using, for example, an eye-tracking system as an input device to eliminate or at least alleviate the phenomenon of vergence-accommodation conflict that is associated with prior augmented and virtual reality devices by adjusting the virtually focused plane of a virtual object that is being located by a user to a focal length that corresponds to the vergence of the user's eyes when looking at that object.

In some cases, the front and rear lens assemblies of each augmented reality display module may be operated such that the net focusing power of the augmented reality display module is zero, but in some embodiments, the front and rear lens assemblies may be operated to provide a net negative (or positive) focusing power to correct for a user's optical prescription, i.e. for correcting refractory errors. In some embodiments, adjustment of the front and rear lens assemblies may take account of a user's presbyopia such that when viewing near real or virtual objects, the augmented reality display module may have a more positive focusing power than when the user is not presbyopic.

DETAILED DESCRIPTION OF THE INVENTION

Following is a description by way of example only with reference to the accompanying drawings of embodiments of the various aspects of the present invention.

BRIEF DESCRIPTION OF THE DRAWINGS

In the drawings:

FIG. 18 is a schematic perspective view of a piezoelectric element for use in a piezoelectric curvature controller of the kind shown in FIGS. 13-17.

FIG. 19 illustrates schematically the principle of operation of the piezoelectric element of FIG. 18.

FIG. 20 is a perspective view of part of the membrane sub-assembly of FIGS. 14-16 in the unactuated state, which shows details of a curvature controller comprising two strips of piezoelectric material of the kind shown in FIGS. 18 and 19 and a curvature sensor comprising another similar strip of piezoelectric material as well as their respective electrical connections and an intermediate insulating layer.

FIG. 21 is another perspective view of the same part of the membrane sub-assembly as shown in FIG. 20, but in the actuated state.

In FIG. 26, the lens assembly is in unactuated state.

In FIG. 38, the front and rear lens assemblies are both shown in zero focusing power states.

EXAMPLE 1: EYEGLASSES WITH VARIABLE FOCUSING POWER LENSES INCORPORATING PIEZOELECTRIC CURVATURE CONTROLLERS

Figure 1:
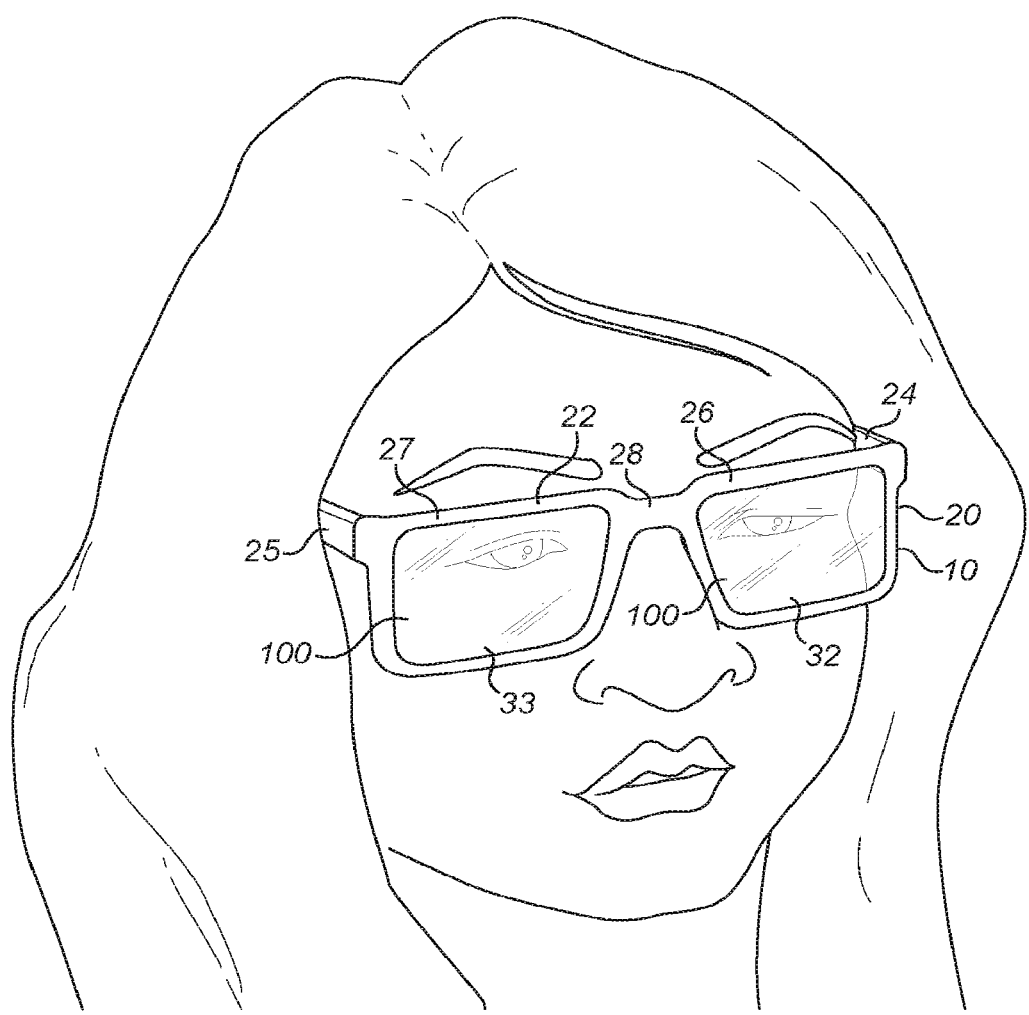
FIG. 1 is a perspective view from above and to the right of the front of a pair of glasses worn by a user and comprising a frame and two right- and left-hand variable focusing power lens assemblies according to the present invention.
Figure 2:
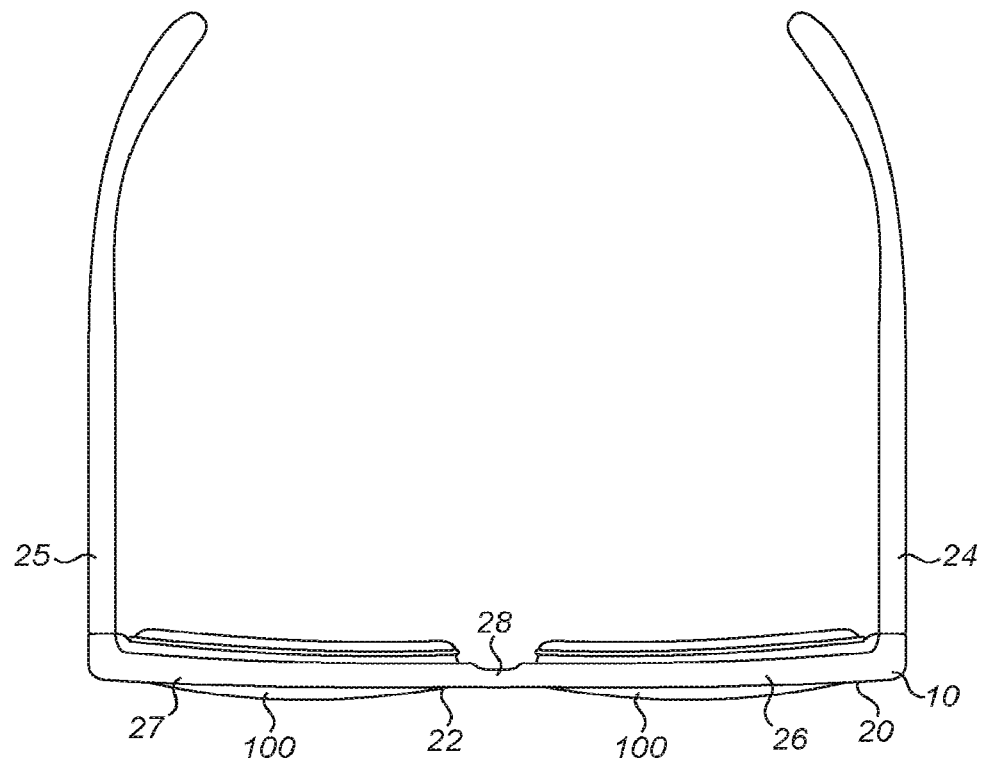
FIG. 2 is a plan view of the glasses of FIG. 1.

FIGS. 1-5 show a pair of eyeglasses 10 in accordance with the present invention. In FIG. 1, the eyeglasses 10 shown in use by a wearer, and the arrangement of the eyeglasses 10 may conveniently be described by reference to the wearer.

Thus, the eyeglasses 10 comprise a frame 20 having a frame front 22 and left and right temple arms 24 and 25 respectively. The frame front 22 comprises left and right eye-wire portions 26 and 27 respectively which are interconnected by a nose-bridge 28. In this regard, it will be appreciated that the eyeglasses 10 are of generally conventional design.

Each of the eye-wire portions 26, 27 of the frame front 22 defines an aperture 32, 33 respectively which is shaped to receive a variable focusing power lens assembly 100 that is described in more detail below, such that each of the lens assemblies 100 is mounted fixedly in the frame 20.

Figure 3:
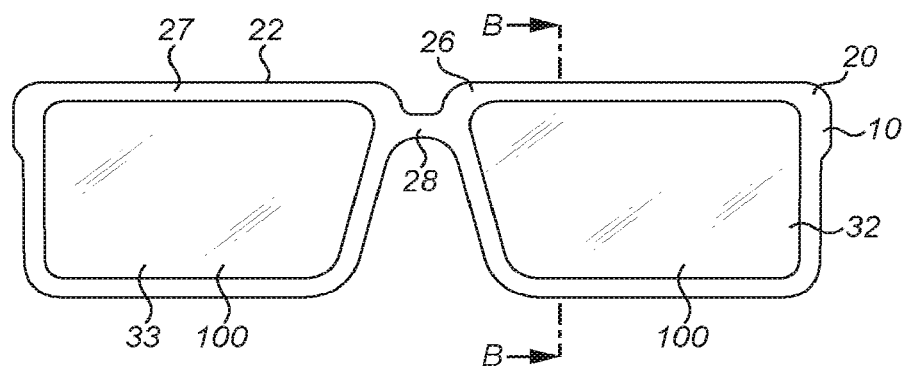
FIG. 3 is a front elevation of the glasses of FIGS. 1 and 2.
Figure 4:
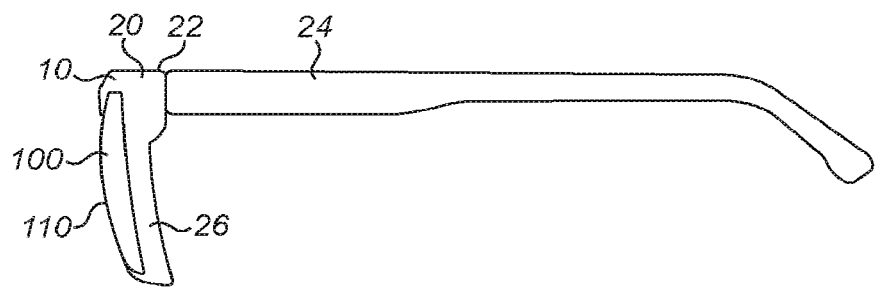
FIG. 4 is a left side elevation of the glasses of FIGS. 1-3.
Figure 5:
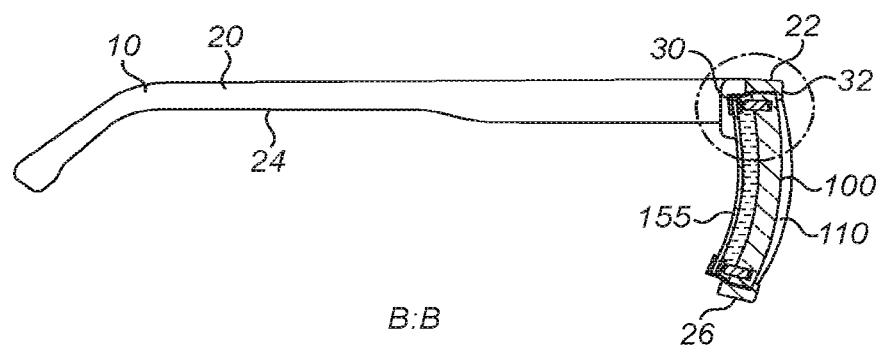
FIG. 5 is a right side elevation, which is partly in cross-section along the line B-B of FIG. 3, of the glasses of FIGS. 1-4.

The precise shape of the eyeglasses of the present embodiment is not intended to be limiting on the scope of the present invention. It will be appreciated that eyeglasses are available in a wide range of different shapes and styles, with different shapes of lenses. The present invention is suitable for use with a wide range of different lens shapes, and to that extent the specific shape of the lens assemblies 100 shown in the accompanying figures is unimportant. The lens assemblies 100 may be symmetrical or asymmetrical, and they may be round or non-round. A typical lens has a circumference of the order of about 150 mm. In the present embodiment, the lens assemblies 100 are non-round and asymmetrical. However, as between lens assemblies 100 mounted in the left and right eye-wire portions 26, 27 they are essentially mirror images of one another as best seen in FIG. 3. Following is a description of the lens assembly 100 that is mounted in the left eye-wire portion 26, but the description is equally applicable to the lens assembly 100 received in the right eye-wire portion 27.

The lens assembly 100 comprises an optically clear hard front lens 110, which may be made from any suitable material known to those skilled in the art for making ophthalmic lenses. The front lens 110 has a front face 112, a rear face 114 and a peripheral side surface 116 and defines an optical axis (not shown). The front lens 110 has a fixed focusing power suitable for ophthalmic use. In the present embodiment as shown best in FIGS. 11 and 12, the front lens 110 has a negative optical power which is suitable for correcting myopia, but in other embodiments the front lens may have a positive optical power, or it may have no optical power. In the present embodiment, the front lens 110 is a meniscus lens; the front face 112 is slightly convex, while the rear face is concave such that the thickness of the front lens 110 increases progressively from the optical centre of the lens (not shown) outwardly towards the peripheral side surface 116. Other types of hard optical lenses of fixed focusing power are known to those skilled in the art and are equally suitable for use in the present invention.

Figure 6:
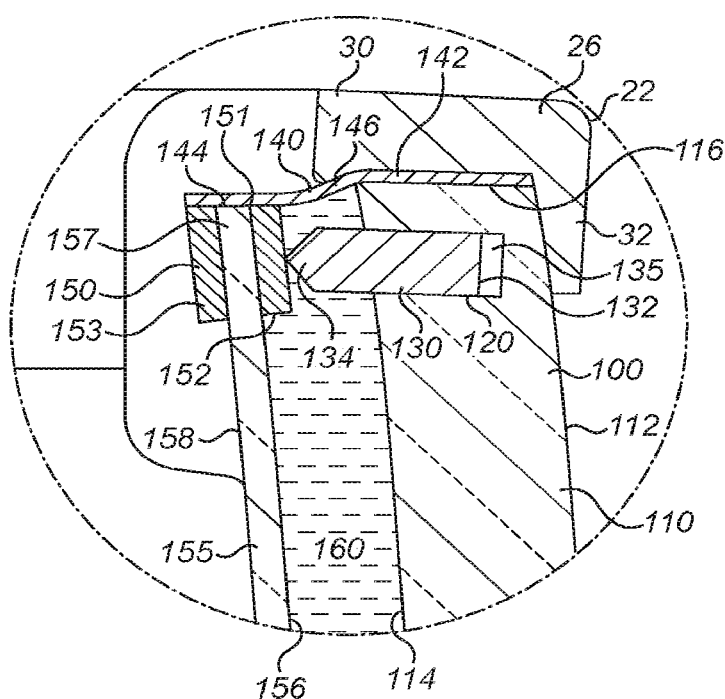
FIG. 6 is an enlarged view of part of FIG. 5, which shows part of the left-hand variable focusing power lens assembly and how it is mounted in the frame of the glasses. Also shown in cross-section is a membrane sub-assembly comprising a distensible membrane and bendable peripheral support rings for holding the membrane around its boundary under tension.

As best shown in FIG. 6, the front lens 110 is shaped to form a snug fit inside the eye-wire portion 26 of the frame 20. The eye-wire portion 26 comprises a main rim portion 30 which extends circumferentially around the peripheral side wall 116 of the front lens 110 and an inwardly protruding front bezel portion 32 which extends over a circumferential region of the front face 112 of the lens 110. The front lens 110 is held firmly within the eye-wire portion 26 and may be cemented in place using a suitable adhesive. In the present embodiment, a forward portion 142 of a flexible side wall 140 is interposed between the peripheral side wall 116 of the front lens 110 and the side portion 30 of the eye-wire portion 26 as described in more detail below.

Figure 11:
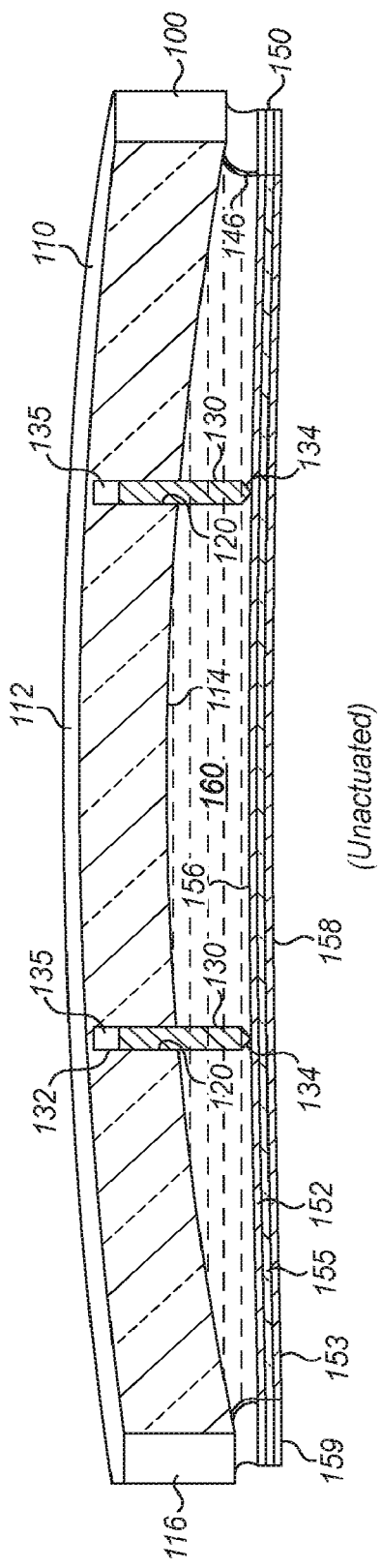
FIG. 11 is a plan view in cross-section along the line A-A of FIG. 7 of the left-hand variable focusing power lens assembly of FIGS. 7-10 in an un-actuated state.
Figure 12:
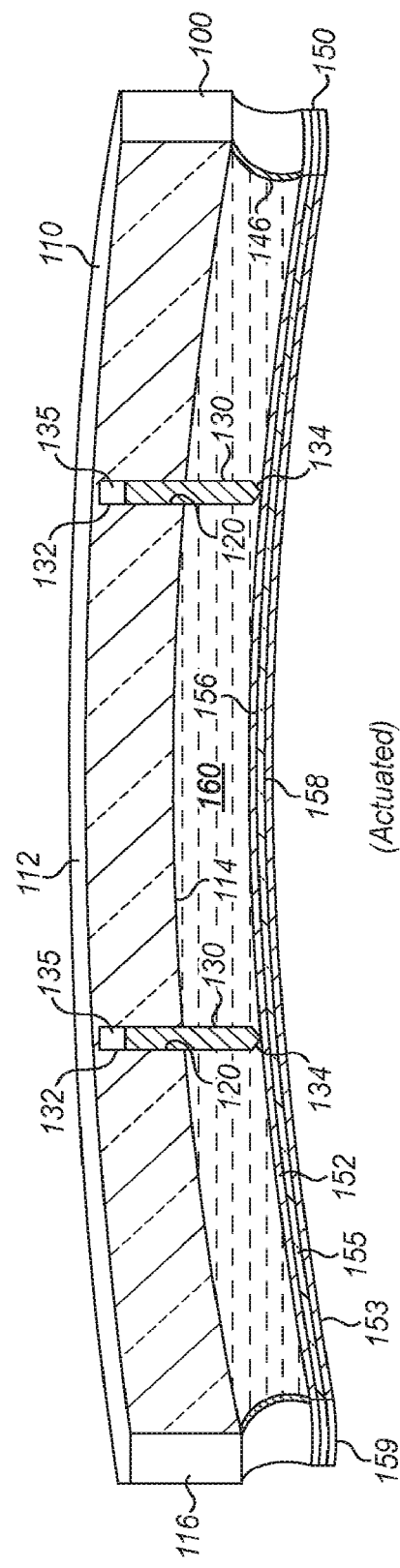
FIG. 12 is another plan view in cross-section along the line A-A of FIG. 7 of the left-hand variable focusing power lens assembly of FIGS. 7-10 in an actuated state.

The hard lens 110 has a plurality of holes 120 formed therein. The holes 120, which do not extend all the way through the lens 110, open onto the rear face 114 of the lens 110 and are spaced circumferentially around the lens 110 close to the peripheral side wall 116. As shown in FIG. 6, in the present embodiment, the holes 120 are formed in the front lens 110 in a peripheral region of the lens 110 that is overlapped by the front bezel portion 32 of the frame 20. In the present embodiment, the holes 120 are cylindrical, but in other embodiments, holes having a cross-section other than circular may be employed. As shown in FIGS. 6, 11 and 12, each of the holes 120 extends more than halfway through the thickness of the front lens 110. The precise depth to which the holes 120 extend into the front lens 110 is not important, however, except that the holes 120 should be of sufficient depth to support stably a corresponding plurality of support pins 130 as described below.

Each support pin 130 has a front end 132 and a rear end 134 and is longer than the depth of its corresponding hole 120. Each support pin 130 has a cross-sectional shape that matches the shape of the corresponding hole 120 with a close tolerance, such that the support pin 130 forms a tight fit in its respective hole 120. Thus, in the present embodiment, each support pin 130 has a circular cross-section. The forward end 132 of each support pin 130 is received in its corresponding hole 120 and the rear end 134 protrudes rearwardly from the rear face 114 of the front lens 110 as shown in FIGS. 11 and 12 in a direction substantially parallel to the optical axis of the front lens 110. Suitably, the front end 132 of each support pin 130 may be cemented in its corresponding hole 120 using a suitable adhesive 135. The support pins 130 are therefore fixedly secured within their respective holes 120.

The length of the support pins 130 and the depth of the holes 120 is such that the front ends 134 of the support pins 130 lie on a common plane. The rear end 134 of each support pin 130 is bevelled or chamfered, as seen most clearly in FIG. 6, to form a point.

In the present embodiment, the lens assembly 100 has four support pins 130, but in other embodiments more than four support pins may be provided, while other embodiments may have fewer than four support pins. Suitably, the lens assembly 100 should have at least three support pins 130. The precise positioning of the support pins 130 around the periphery of the front lens 110 is described in more detail below.

As described above, a forward portion 142 of a flexible side wall 140 is sandwiched between the peripheral side wall 116 of the front lens 100 and the side portion 30 of the frame front 22. The side wall 140 is made from an optically clear, flexible thermoplastic polyurethane (e.g. Tuftane®, which is commercially available from Messrs. Permali Gloucester Ltd, Gloucester, UK) and is about 50 μm thick, but other suitable materials may be used and the thickness adjusted accordingly. Although the side wall 140 is optically clear in the present embodiment, this is not strictly necessary, and in other embodiments it may be opaque.

The side wall 140 has a rearward portion 144 which is attached to a peripheral edge 151 of a membrane subassembly 150 as shown in FIG. 6. The rearward portion 144 of the side wall 140 is bonded continuously to the peripheral edge 151 of the membrane subassembly 150 with a light curable adhesive (e.g. Delo® MF643 UV curing epoxy adhesive) or other suitable means to form a fluid-tight seal therewith. Between the rear face 114 of the front lens 110 and the membrane subassembly 150, the sidewall includes a collapsible intermediate portion 146 as shown in FIGS. 6, 11 and 12, such that the membrane subassembly 150 is mounted to the front lens 110 and is spaced from the rear face 114.

The membrane subassembly 150 comprises a distensible membrane 155 having a peripheral region 157 that is sandwiched between two bendable ring elements 152 and 153 in a manner similar to that disclosed in WO 2013/144533 A1, the contents of which are incorporated herein by reference. A front one of the ring elements 152 is bonded to a front face 156 of the membrane 155, while a rear one of the ring elements 153 is bonded to a rear face 158 of the membrane 155, and together the front and rear ring elements 152, 153 form a unitary bendable support ring 159 for holding the membrane 155 under tension around its periphery.

Each ring element 152, 153 is fabricated from a sheet of stainless steel and has a thickness of about 0.25 mm, but more generally each ring element may have a thickness in the range of about 0.1-0.5 mm. As best shown in FIG. 6, each of the ring elements 152, 153 has substantially flat front and rear surfaces. Suitably, each of the ring elements 152, 153 has a width of no more than about 2-3 mm, preferably less than 1 mm. Alternatively, the two ring elements 152, 153 may be replaced by a single bendable ring element that is bonded to the front or rear face 156, 158 of the membrane 155 to serve as the support ring. A single ring element of this kind would suitably have a thickness in the range about 0.4-0.7 mm, e.g. 0.55 mm, and substantially flat front and rear surfaces.

In the present embodiment, the distensible membrane 155 is formed from a sheet of a thermoplastic polyurethane (e.g. Elastollan® 1185A10, which is commercially available from Messrs. BASF) having a thickness of about 220 μm. Other suitable materials that may be used for the membrane 155 as well as other components of the lens assembly 100 are disclosed by WO 2017/055787 A2, the contents of which are also incorporated herein by reference.

The membrane 155 is held by the support ring 159 at a line tension of about 200 $Nm^{-1}$ to reduce sagging of the membrane 155 owing to gravity or hydrostatic pressure and to minimise unwanted vibrations in the membrane 155 in use. In other embodiments, a greater line tension may be used, and in some embodiments, the line tension may be slightly lower, but it has been found that a line tension of at least about 180 $Nm^{-1}$ is preferred. Suitable methods for assembling the membrane subassembly 150 with the membrane 155 under tension are disclosed by WO 2017/055787 A2.

Figure 7:
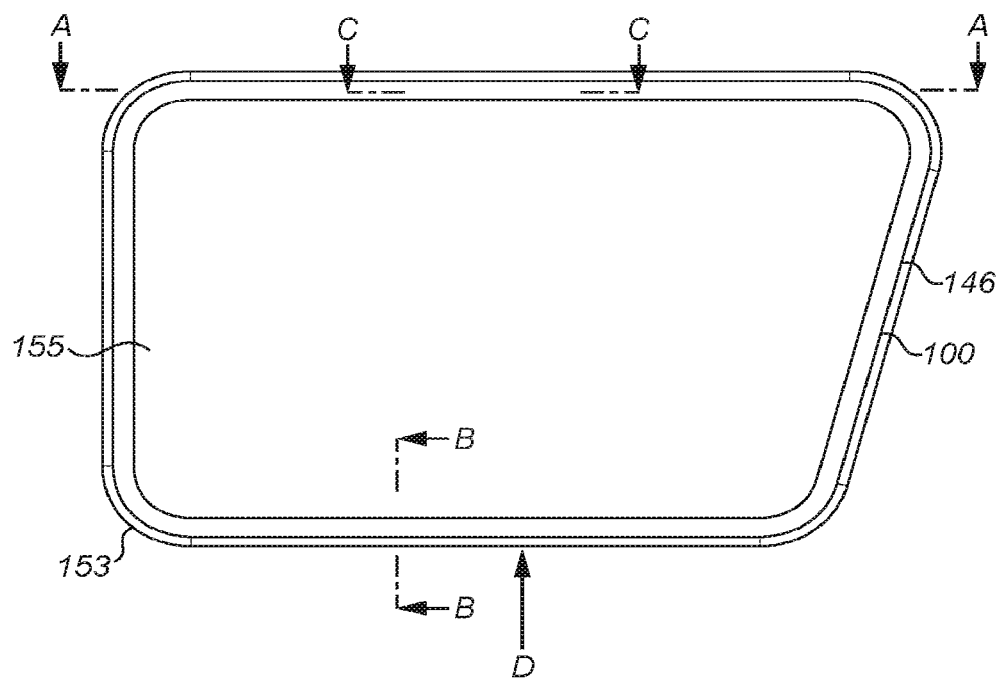
FIG. 7 is a rear elevation of the left-hand variable focusing power lens assembly of the glasses of FIGS. 1-6.
Figure 8:
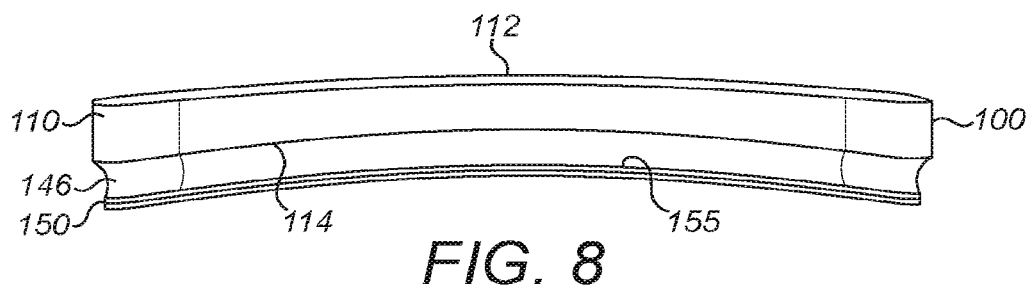
FIG. 8 is a plan view of the left-hand variable focusing power lens assembly of FIG. 7.
Figure 9:
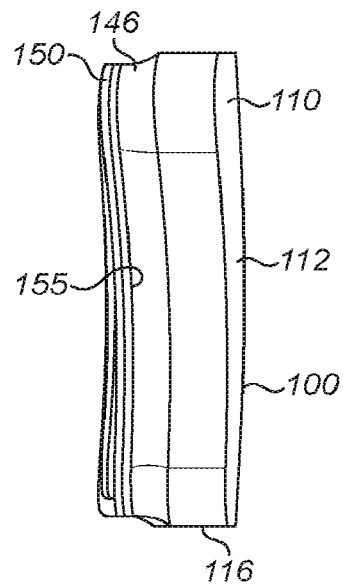
FIG. 9 is a right side elevation of the left-hand variable focusing power lens assembly of FIGS. 7 and 8.
Figure 10:
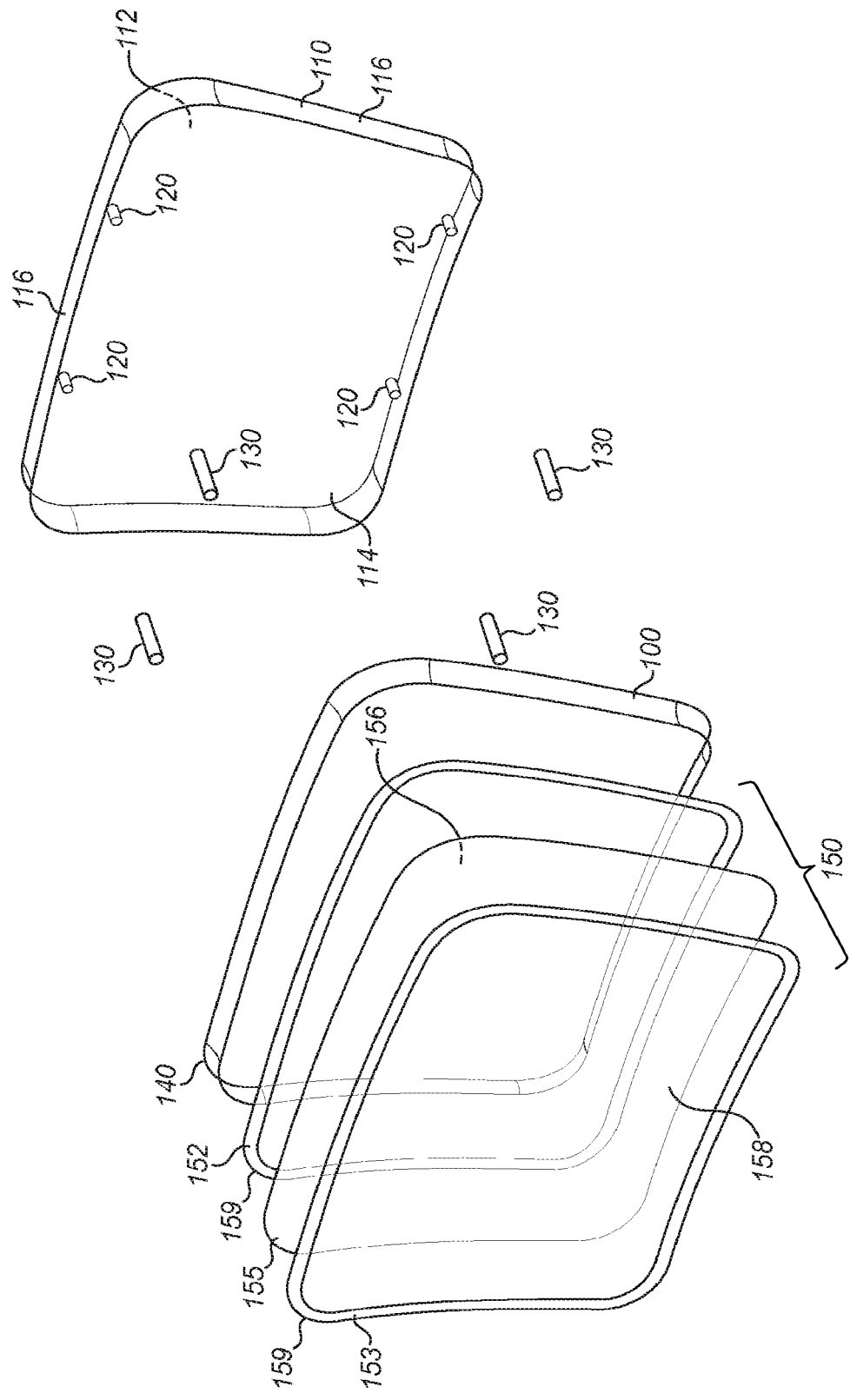
FIG. 10 is an exploded view from above and to the right of the rear of the left-hand variable focusing power lens assembly of FIGS. 7-9, which shows the membrane sub-assembly.

As best seen in FIG. 7, the outline shape of the membrane 155 is similar to the shape of the front lens 110 such that the ring elements 152, 153 generally follow the outline shape of the front lens 110 in proximity to its side surface 116 and are disposed within the peripheral region of the front lens 110 that is overlapped by the front bezel portion 32 of the frame 20.

As shown in FIGS. 11 and 12, the rear ends 134 of the support pins 130 contact the front ring element 152 to datum the membrane 155 from the rear face 114 of the front lens 110 at the locations of the support pins 130. In some embodiments, the support pins 130 may simply touch the support ring 159 without being physically attached thereto, but in other embodiments, the rear ends 134 of the support pins 130 may be coupled to the support ring 159 in such a manner as to maintain contact between the rear end 134 and the support ring, but to allow the support ring to pivot on the rear end 134.

The rear ends 134 of the support pins 130 thus form hinge points where the distance between the front face 156 of the membrane 155 and the rear face 144 of the front lens 110 is fixed. Intermediate the hinge points, the support ring 159, which in the present embodiment comprises the front and rear ring elements 152, 153, is free to bend towards or away from the rear face 114 of the front lens 110 in a direction parallel to the optical axis of the front lens 110.

The rear face 114 of the front lens 110, the front face 156 of the membrane 155, which is disposed opposite the rear face 114, and the collapsible intermediate portion 146 of the side wall 140 thus form a sealed envelope having a fixed volume. The envelope is filled with a sensibly incompressible, optically clear, refractive fluid 160.

The fluid 160 should be colourless and have a refractive index of at least about 1.5. Suitably the refractive index of the membrane 155 and fluid 160 should be matched, so that the interface between the membrane 155 and fluid 160 is substantially imperceptible to the user. The fluid 160 should have low toxicity and low volatility; it should be inert and exhibit no phase change above about −10° C. or below about 100° C. The fluid 160 should be stable at high temperatures of at least about 80° C. and exhibit low microbial growth. In some embodiments, the fluid 160 may have a density of about 1 g/cm³. Various suitable fluids are available to those skilled in the art, including silicone oils and siloxanes such, for example, as phenylated siloxanes. A preferred fluid is pentaphenyltrimethyltrisiloxane.

In the present embodiment, the membrane 155 is formed from a polyether polyurethane such, for example, as Elastollan® 1185, and the fluid 160 is a phenylated siloxane such, for example, as pentaphenyltrimethyltrisiloxane. The refractive indexes of the membrane material and fluid are suitably the same or substantially the same and are at least 1.5.

The present invention therefore provides a lens assembly 100 in which a bendable support ring 159 is mounted to and datumed from a surface 114 of a hard lens 110 by means of a plurality of support pins 130 that protrude from the surface 114 of the hard lens 110 to engage with the support ring 159, such that the support ring 159 is hinged to the support pins 130 and is free to bend between the support pins 130. Advantageously, this arrangement in accordance with the invention eliminates the need to connect the support ring 159 to a chassis structure or the like around the lens assembly 100.

The lens assembly 100 thus forms a composite lens having a first optical surface which is provided by the front face 112 of the hard lens 110 and a second opposite optical surface that is provided by the membrane 155. It will be appreciated that although in the present embodiment, the hard lens 110 is positioned forwardly of the membrane 155 relative to a wearer, in other embodiments the positions of the hard lens 110 and membrane 155 may be reversed, with the hard lens positioned behind the membrane 155, such that the hard lens forms a rear lens instead of a front lens.

In its undeformed state, as shown in FIG. 11, the membrane 155 is flat and defines an (x,y)-plane. A z-axis normal to the (x,y)-plane is substantially aligned with or coincident with the optical axis of the front lens 110. The focusing power of the lens assembly 100 can be varied by controlling the distribution and pressure of the fluid 160 within the envelope defined between the hard lens 110 and the membrane 155 to cause the membrane 155 to distend outwardly away from the hard lens 110 or contract inwardly towards the hard lens 110 to change the form of the optical surface formed by the membrane 155.

Numerous possible mechanisms for redistributing and adjusting the pressure of the fluid within the envelope by moving the support ring 159 towards or away from the front lens 110 are available to those skilled in the art. Examples of such mechanisms are described, for example, in WO 2013/144592 A1 and WO 2017/055787 A2, which have already been mentioned above, as well as WO 2014/118546 A1, the contents of which is also incorporated herein by reference.

For instance, in some embodiments, the lens assembly 100 may comprise one or more selectively operable boundary height controllers (not shown) that are connected to the support ring 159 at one or more actuation points around the support ring for actively displacing the support ring 159 towards or away from the hard lens 110 on the z-axis. Movement of the support ring 159 towards the hard lens serves to compress the envelope around its edge, thereby increasing the pressure of the fluid 160 in the envelope and redistributing it towards the centre of the envelope, causing the membrane 155 to distend outwardly away from the hard lens 110 on the z-axis, making the focusing power of the lens assembly 100 more positive. Conversely, movement of the support ring 159 away from the hard lens 110 serves to expand the envelope around its edge, thereby reducing the pressure of the fluid 160 in the envelope and redistributing it outwardly from the centre of the envelope towards its edge, causing the membrane 155 to contract or distend inwardly towards the hard lens 110 on the z-axis, making the focusing power of the lens assembly 100 more negative.

For optical use, the form of the membrane 155 should either be flat as shown, for example, in FIG. 11, or spherical, or nearly spherical, as shown, for example, in FIG. 12 with an optical centre. Specifically, it is desirable that the membrane 155, when distended or contracted as described above, should have a form that is defined by one or more Zernike polynomials (e.g., sphere, cylinder, etc.) which are well known to those skilled in the field of ophthalmology. Owing to the non-round shape of the membrane 155, this implies adjusting the profile of the support ring 159, and therefore of the edge of the membrane 155, as the membrane 155 is distended or contracted, such that the profile of the edge of the membrane 155, at all degrees of distension or contraction, matches the desired 3-dimensional form of the membrane 155, as defined by one or more Zernike polynomials, at the edge of the membrane 155. In the case of spherical distension of the membrane 155, for example, the non-circular edge of the membrane 155 must be manipulated to form a projection of itself onto multiple spheres. In the case of distension of the membrane to a form that includes sphere and a degree of cylinder to correct for astigmatism, the non-circular edge of the membrane 155 must be manipulated to form a projection of itself onto multiple three-dimensional composite surfaces that include a spherical component and a toric component. In order to achieve this, one or more regions of the support ring 159, which holds the membrane 155 around its edge, must be displaced locally towards or away from the hard lens 110, as described in detail in WO 2013/144592 A1, which is referenced above, as well as in WO 2015/044260 A1, the contents of which are also incorporated herein by reference.

Further, as described in more detail in Example 3 below, in in the case of spherical deformation of the membrane 155, a notional volume-conserving neutral circle exists that is common across all state of distension of the membrane 155. The neutral circle is defined by the intersection of a plane at a fixed distance from the rear lens 110 with the membrane 155, such that the volume of fluid 160 bounded by the plane and membrane is always equal above and below the plane. In other words, the volume of fluid 160 inside the notional neutral circle is equal to that displaced outside of it owing to distension or contraction of the membrane 155. The centre of the neutral circle is both the point of maximum distension of the membrane and the optical centre of the membrane 155. In the case of distention according to a series of Zernike polynomials that includes a spherical component and a toric component, there is a neutral ellipse instead of a neutral circle. The support pins 130 are located at or close to where the neutral circle crosses the support ring 159, since these locations remain at a fixed distance from the rear lens 110 regardless of the state of distension of the membrane are therefore suitable hinge points for datuming the support ring 159 to the rear lens 110.

Figure 12A:
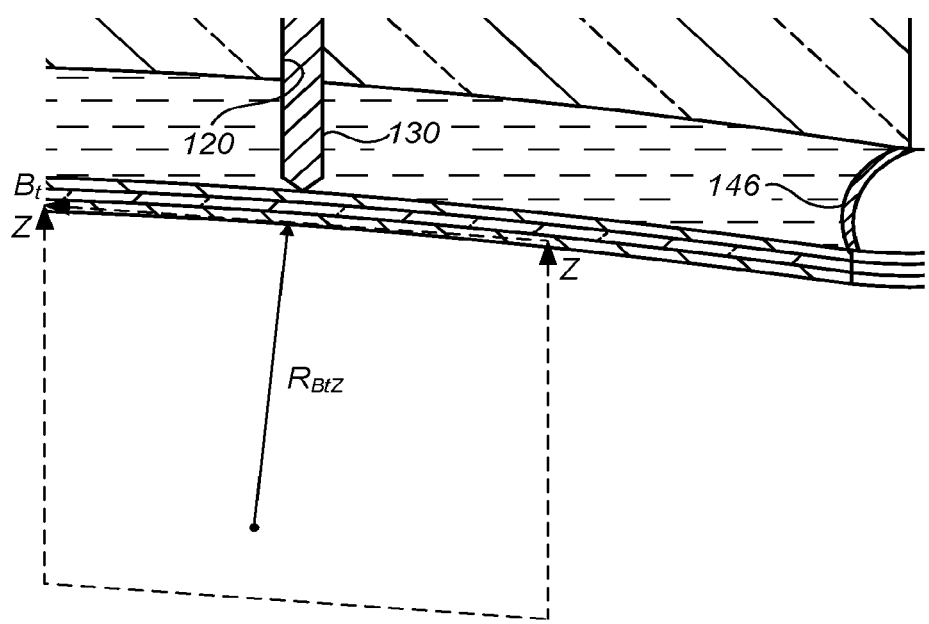
FIG. 12A is an enlarged portion of FIG. 12 which shows the radius of curvature ($R_{Btz}$) of the support rings in the actuated state in a plane defined by the optical axis (z) of the lens assembly and a tangent to the boundary of the membrane (Bt).
Figure 13:
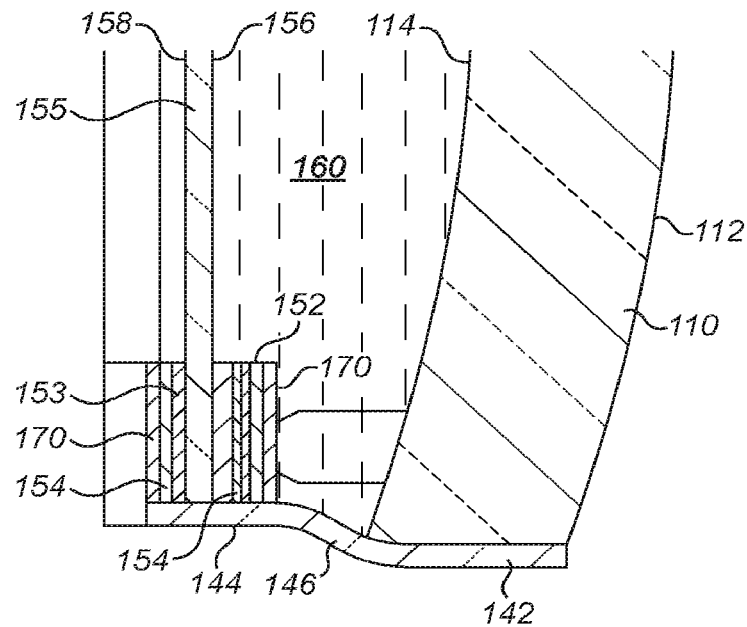
FIG. 13 is an enlarged cross-sectional view along the line B-B of FIG. 7 of part of the left-hand variable focusing power lens assembly, which shows the membrane sub-assembly in cross-section.

In accordance with the present invention, the shape or profile of the edge of the membrane 155 is controlled by actively controlling the curvature ($1/R_{Btz}$) of one or more discrete regions of the support ring 159 in a plane (Btz) defined by the z-axis normal to the (x,y)-plane of the undeformed membrane 155 and a tangent (t) to the periphery (or boundary (B)) of the membrane 155 as shown in FIG. 12A.

Figure 14:
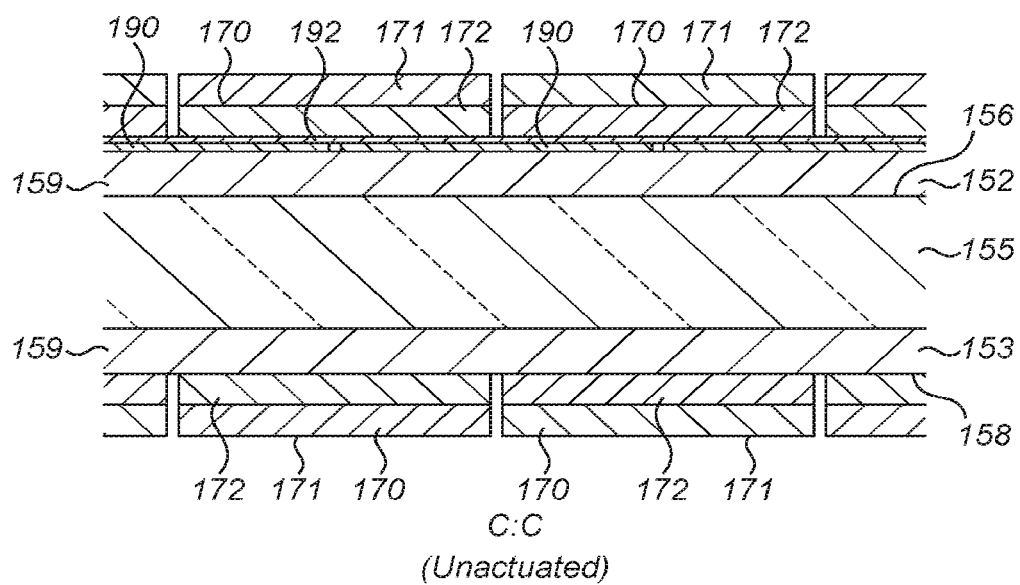
FIG. 14 is an enlarged view of part of the membrane sub-assembly of FIG. 13 in cross-section along the line C-C of FIG. 7, with the lens assembly in its unactuated state, which shows a plurality of discrete curvature controllers and corresponding curvature sensors attached to one of the support rings for controlling and monitoring the curvature of the boundary of the membrane.
Figure 15:
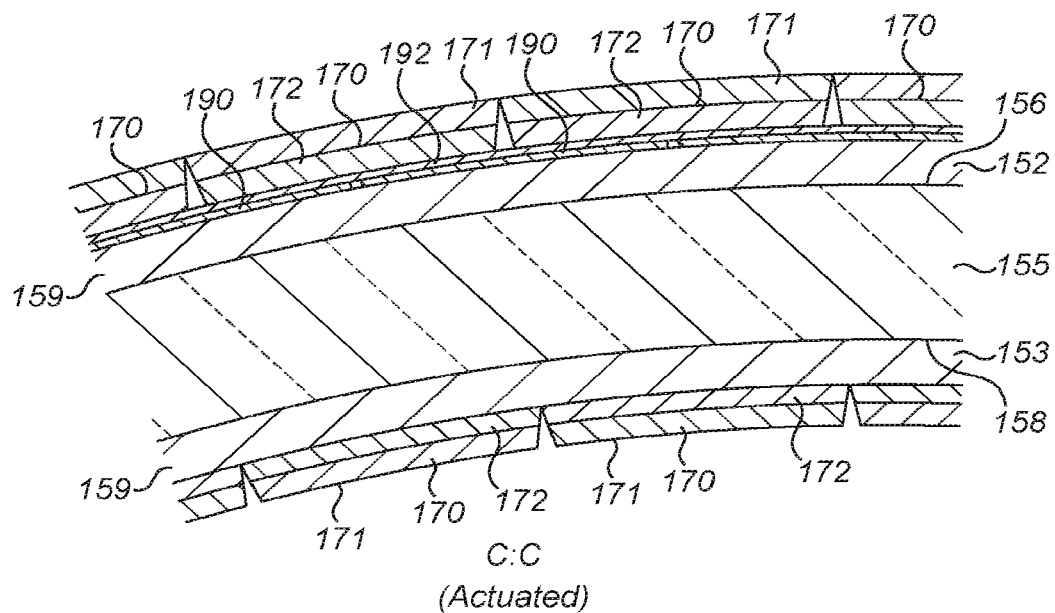
FIG. 15 is another enlarged cross-sectional view of the part of the membrane sub-assembly of FIG. 14 along the line C-C of FIG. 7, with the lens assembly in its actuated state.
Figure 16:
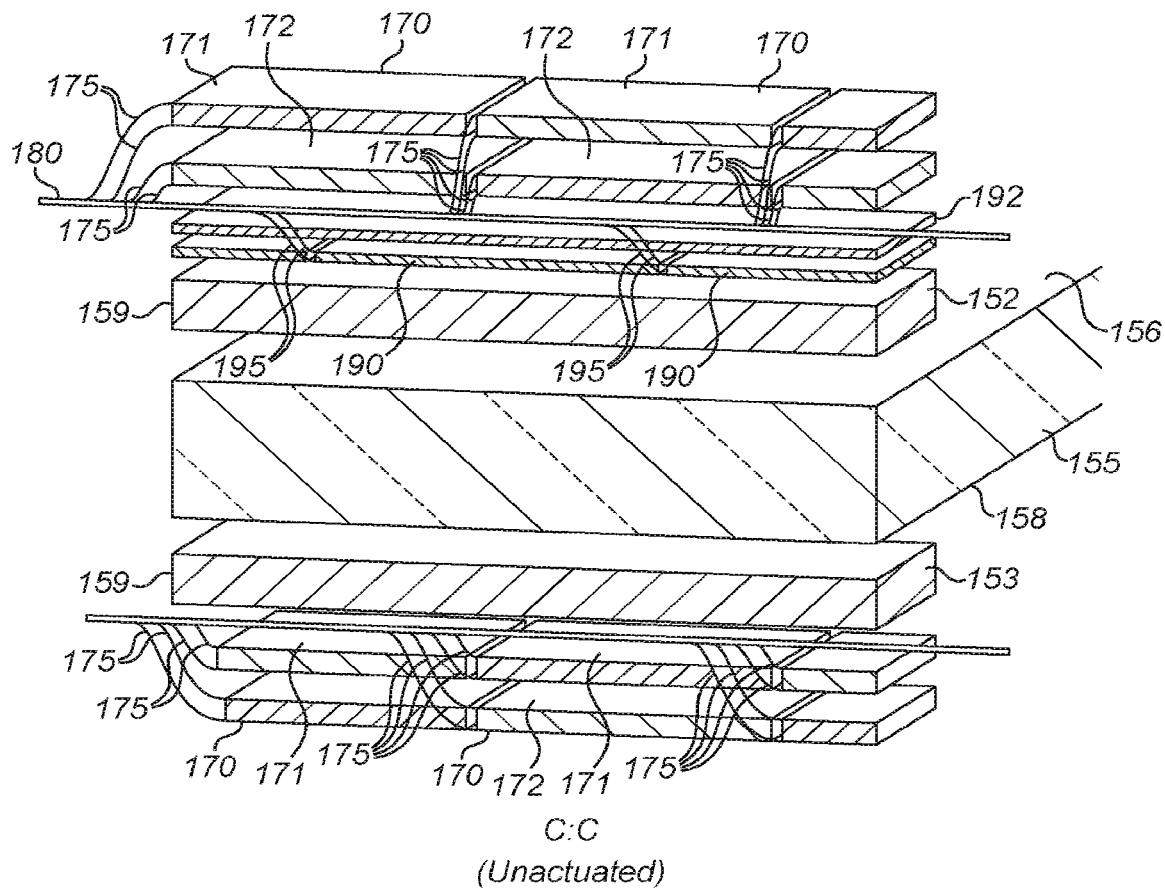
FIG. 16 is an exploded perspective view in cross-section on the line C-C of FIG. 7 of the same part of the membrane sub-assembly as shown in FIGS. 14 and 15, but with the lens assembly in its unactuated state, which shows the piezoelectric curvature controllers and curvature sensors and an electronic bus providing electrical connections to them.
Figure 17:
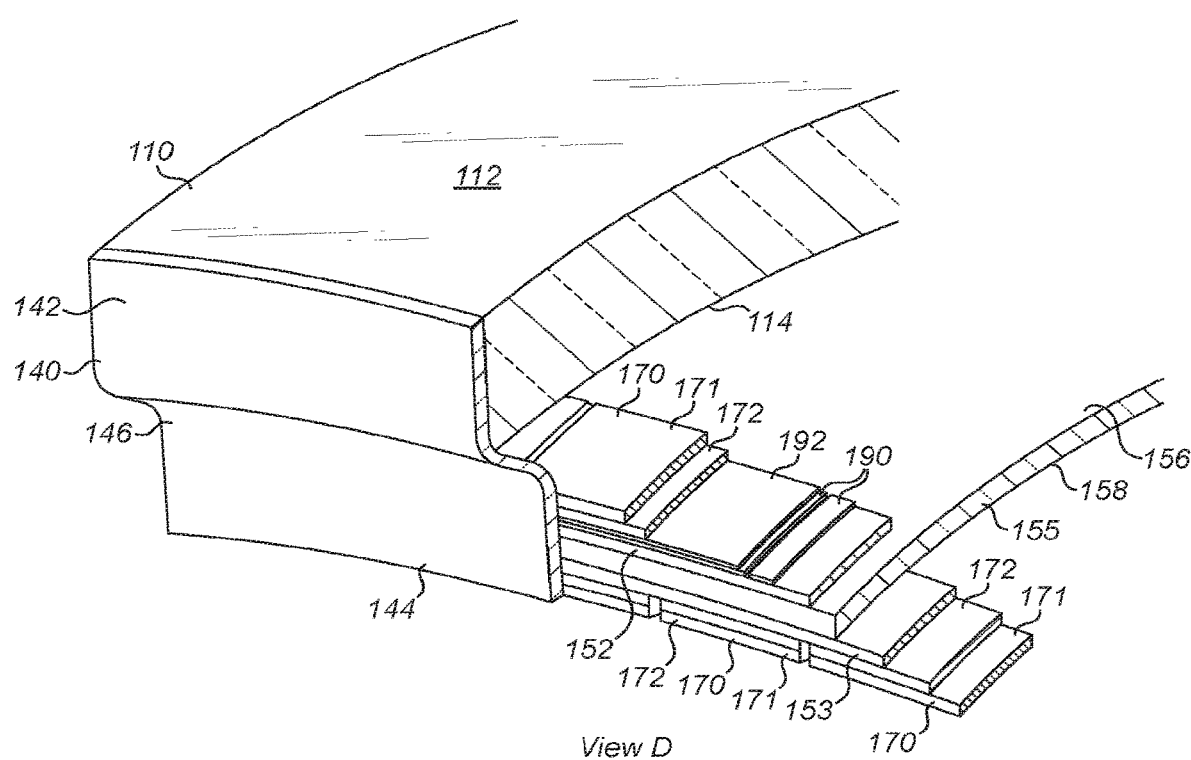
FIG. 17 is a perspective cutaway view from the front and to the left of part of the bottom of the variable focusing power lens assembly of FIGS. 7-10 which shows details of the membrane sub-assembly of FIGS. 13-16, including the piezoelectric curvature controllers and curvature sensors.

As shown in FIGS. 13-17, the ring member 159 carries a plurality of piezoelectric curvature controllers 170, which are attached to respective discrete sections of the front and rear ring elements 152, 153 around the support ring 159. In particular, the curvature controllers are mounted on the front face of the front ring element 152 and the rear face of the rear ring element 153. As shown in FIGS. 16 and 17, each curvature controller 170 has a width that is approximately the same as the ring element to which it is attached such that the curvature controller 170 does not obtrude beyond the inner or outer edges of the ring element 152, 153 to which it is attached.

Each curvature controller 170 comprises a plurality of layers of piezoelectric material 171, 172. In the present embodiment, there are two layers which form a piezoelectric bimorph as shown in FIGS. 20 and 21, but in other embodiments more than two layers may be used as required. Each layer of piezoelectric material 171, 172 has two opposite electrically conducting faces 173, 174 as shown in FIG. 18. When an electric field is applied across the piezoelectric material 171, 172, it contracts or expands in the circumferential direction of the support ring 159 depending on the crystal orientation of the material and the direction of the electric field, as illustrated in FIG. 19. In the present embodiment, each layer of piezoelectric material 171, 172 is arranged to expand in the circumferential direction of the support ring 159 (indicated by s in FIG. 19) for a positive electrical field applied between the faces 173, 174 of the piezoelectric material; a positive potential difference between the faces 173, 174 causes the layer 171, 172 to expand in the s direction around the support ring 159 and contract in an orthogonal direction that is parallel to the z-axis as indicated in FIG. 19. It will be understood that the z direction is generally parallel to the direction of distension or contraction of the membrane 155 as described above. Each curvature controller 170 may be capable of developing a power of about 1 mW or more.

The electrically conducting faces 173, 174 of each layer of piezoelectric material 171, 172 are each connected to a conductive wire 175 for controlling the potential difference between the two faces 173, 174. Each of the wires 175 is connected to an electronic bus 180 as shown in FIG. 16, such that each piezoelectric curvature controller 170 around the support ring 159 is individually addressable.

Figure 21A:
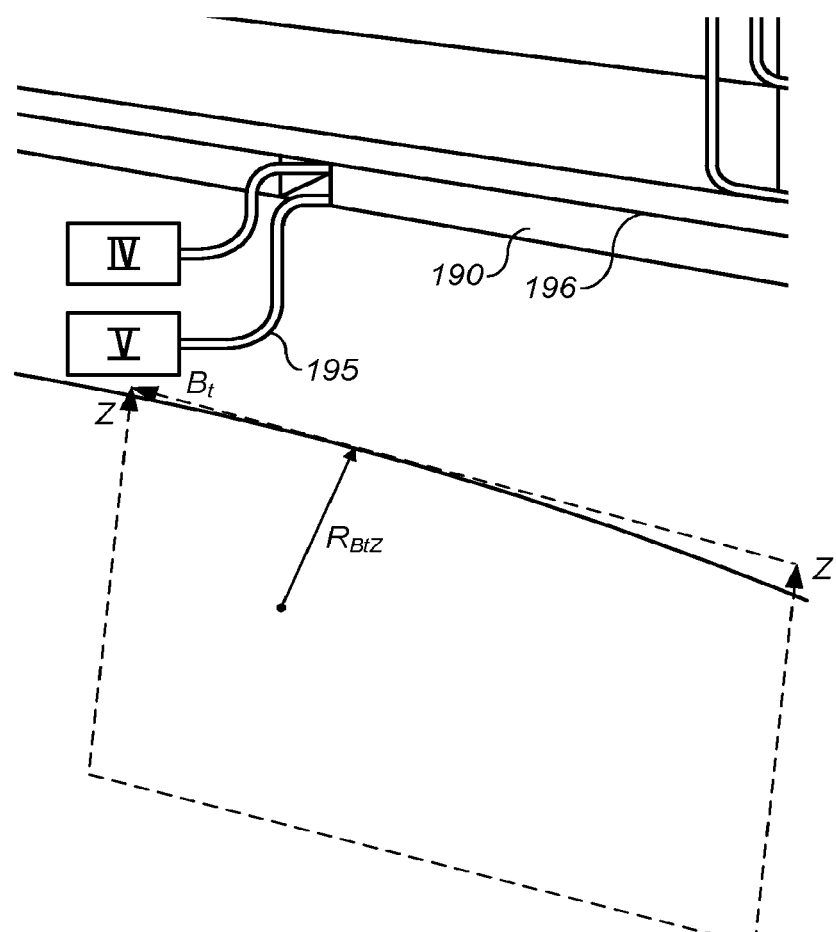
FIG. 21A is an enlarged portion of FIG. 21 which shows the radius of curvature ($R_{Btz}$) of the support ring in the actuated state in a plane defined by the optical axis (z) of the lens assembly and a tangent to the boundary of the membrane (Bt).

FIGS. 20 and 21 illustrate operation of the curvature controllers 170. In FIG. 20, which shows two adjacent curvature controllers 170 attached to respective sections of the front ring element 152, the piezoelectric layers 171, 172 of each curvature controller 170 are in an undeformed zero-field state, such that the curvature controller 170 is in an unactuated state. In order to actuate the curvature controller 170, a more positive electrical field is applied across the faces of one of the layers 171, i.e. between I and II shown in FIGS. 20 and 21, than across the other layer 172, i.e. between II and III, such that the one layer 171 expands in the s direction more than the other layer 172, causing the bimorph to bend as shown in FIG. 21, which in turn causes the support ring 159 to bend. Those skilled in the art will appreciate that the expression "more positive electrical field" does not mean that either of the piezoelectric layers 171, 172 is under a positive field. For instance, if I, II and III were held at 0V, 0V and −100V respectively, then the one layer 171 would experience no z-direction electric field, while the other layer 172 would experience a negative electrical field in the z-direction. In that case, the one layer 171 would remain the same length, while the other layer 172 would contract in the s direction to cause bending as shown in FIG. 21. The radius of curvature ($1/R_{Btz}$) in the plane of the z-axis and tangent to the support ring 159 that is imparted to the support ring 159 is illustrated in FIG. 21A.

As shown in FIGS. 14-16, each of the front and rear ring elements 152, 153 carries a plurality of curvature controllers 174 controlling the corresponding sections of the support ring 159. However, in some embodiments, curvature controllers 170 may be attached only to one side of the support ring 159, especially where the support ring 159 consists of only one ring element. Where curvature controllers 170 are attached to each side of a single section of the support ring 159, they should be operated to complement one another, i.e. to cause bending of the support ring 159 the same direction. In some embodiments, curvature controllers 170 may be placed around the whole of the support ring 159. Alternatively, curvature controllers 170 may be placed only around certain regions of the support ring 159 where precise control over the curvature of the support ring 159 is required, for instance in the nasal region of an ophthalmic lens as described in Example 3 below. The number, size and spacing of the curvature controllers 170 will depend on the degree of control required over the profile of the support ring 159 and on the ability to provide sufficient electrical power within frame 20 of the eyeglasses 10. In some regions of the support ring 159, a plurality of curvature controllers 170 may be placed closely adjacent one another, or even contiguously, as shown in FIGS. 14-16 of the accompanying drawings. Alternatively, the curvature controllers 170 may be spaced further apart from one another.

Referring to FIGS. 11 and 12, a plurality of curvature controllers 170 placed around the support ring 159 may be used to cause the support ring 159 to bend from an unactuated state as shown in FIGS. 11 and 14 to an actuated state shown in FIGS. 12 and 15, in which the support ring 159 is bent in such a manner as to cause expansion of the envelope towards its edge and compression towards its centre, redistributing the fluid 160 within the envelope and causing the membrane 155 to distend forwardly towards the front lens 110, and thereby causing the focusing power of the lens assembly 100 to become more negative, as described above. As will be appreciated, some regions of the support ring 159 are bent forwards towards the front lens 110, while other regions are bent rearwards away from the front lens 110. Further, the curvature controllers 170 placed around the support ring 159 may be used to control the local curvature of the support ring 159 such that the profile of the support ring 159 when actuated complies with the desired distended or contracted shape of the membrane 155, i.e. it forms a projection of itself onto multiple spheres of different radii or different compound 3D forms comprising one or more spherical and/or toric components as described above.

Upon removing the electrical fields from the piezoelectric layers 171, 172 of each curvature controller 170, the support ring 159 is allowed to return to its unactuated state owing to resilience in the ring elements 152, 153 of the support ring 159. It will be appreciated that in some embodiments, the membrane 155 may have a minimum curvature in its 'unactuated state' instead of going flat as in the present embodiment.

In addition to the curvature controllers 170, the lens assembly 100 of the present embodiment further also includes a plurality of curvature sensors 190 for measuring the degree of curvature of corresponding regions of the support ring 159. The curvature sensors 190 are attached to the front ring element 152 intermediate the curvature controllers 170, as seen most clearly in FIGS. 20 and 21. A continuous layer of insulating material 192 is interposed between the curvature controllers 170 and the curvature sensors 190. In the present embodiment, curvature sensors are not attached to the rear ring element 153, but in other embodiments of the invention, curvature sensors 190 may be attached to both the front and rear ring elements 152, 153, or only to the rear ring element 153.

Each curvature sensor 190 comprises a layer of piezoelectric material 194 having two opposite electrically conducting faces 196, 197, each of which is connected to the electronic bus 180 by respective wires 195. In this way, the curvature sensors 190 are also individually addressable. Upon bending of the support ring 159 in the region of one of the curvature sensors 190, the curvature sensor 190 is caused to lengthen, giving rise to a measurable potential difference between IV and V as indicated in FIGS. 20 and 21, the amount of the potential difference being related to the degree of curvature of the support ring 159.

The curvature controllers 170 and curvature sensors 190 may be attached to the support ring 159 by any suitable method. For instance, in some embodiments, the curvature controllers 170 and/or curvature sensors 190 may be pre-fabricated and bonded to the support ring 159 using a suitable adhesive such, for example, as a two-part epoxy. In other embodiments, the piezoelectric curvature controllers 170 and/or curvature sensors 190 may be fabricated directly on the support ring 159 by inkjet printing as disclosed, for example, by Thuau D. et al. in "All inkjet-printed piezoelectric electronic devices: energy generators, sensors and actuators." *J. Mater. Chem. C*, 2017, 5, 9963-9966, the contents of which are incorporated herein by reference.

Figure 22:
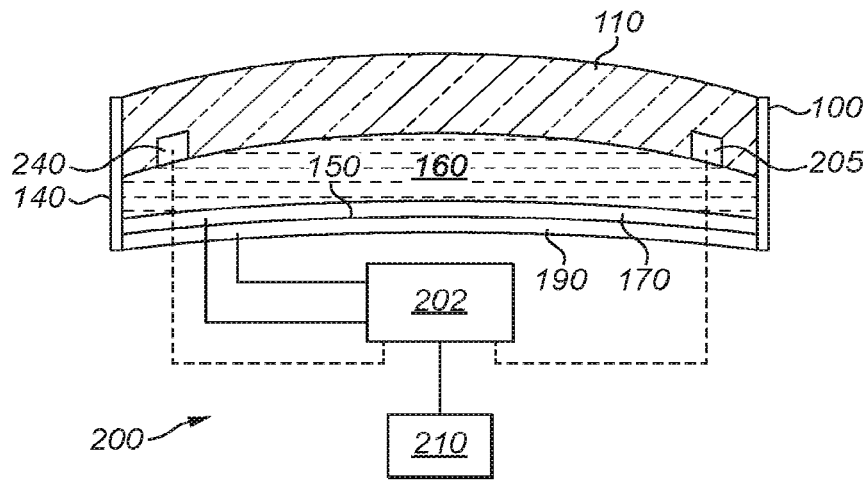
FIG. 22 is a schematic diagram of an electronic control system for the variable focusing power lens assembly of FIGS. 7-21.

The lens assembly 100 is controlled using an electronic control system 200, which is shown schematically in FIG. 22. The control system 200 comprises a microcontroller 202 which has a processor and a memory containing machine-readable instructions in the form of machine readable code and data for controlling operation of the lens assembly 100. Microcontrollers of this kind are well-known in the art and need not be described in detail herein.

The microcontroller 202 is arranged to receive sensor signals from the curvature sensors 190 on the support ring 159 which forms part of the membrane subassembly 150, as well as from a pressure sensor 204 and a temperature sensor 205 for measuring the pressure and temperature respectively of the fluid 160 within the envelope. In some embodiments one or other or both of the pressure and temperature sensor 204, 205 may be omitted. The microcontroller is also arranged to receive an input signal from an input device 210 for inputting to the microcontroller 202 a target focussing power of the lens assembly 100.

In some embodiments the input device 210 may comprise a user-operable device, which may be manually operated, e.g., a dial, switch or the like, or electronically operated. In the latter case, the input device 210 may comprise an electronic interface which the user can use to input a target focusing power to the microcontroller 202. For instance, the electronic interface may comprise a mobile device such as a mobile telephone or tablet or a personal computer, which may be hardwired or connected wirelessly to the microcontroller 202. Alternatively, in some embodiments, the target focusing power of the lens assembly 100 may be set automatically. In such embodiments, the input device 210 may receive a signal from an eye-tracking system or from a range-finding device such, for example, as an optical or ultrasonic sensor.

The microcontroller 202 is also arranged to output control signals to the curvature controllers 170. In the present embodiment, each curvature controller 170 is individually addressable by the microcontroller 202.

The curvature controllers 170 and curvature sensors 190 are connected to the microcontroller via the electronic bus 180 mentioned above.

The data included in the memory device of the microcontroller 202 includes data relating the curvature of a plurality of discrete regions of the support ring 159, where the curvature sensors 190 are located, to the focusing power of the lens assembly 100, and to the pressure and/or temperature of the fluid 160 (where a temperature or pressure sensor is provided).

A suitable power source (not shown) such, for example, as a battery is provided for powering the curvature controllers 170, microcontroller 202, sensors 204, 205 and input device 210. The battery may be accommodated in any suitable location within the frame 20 of the eyeglasses 10, for example within one or both of the temple arms 24, 25.

Figure 23:
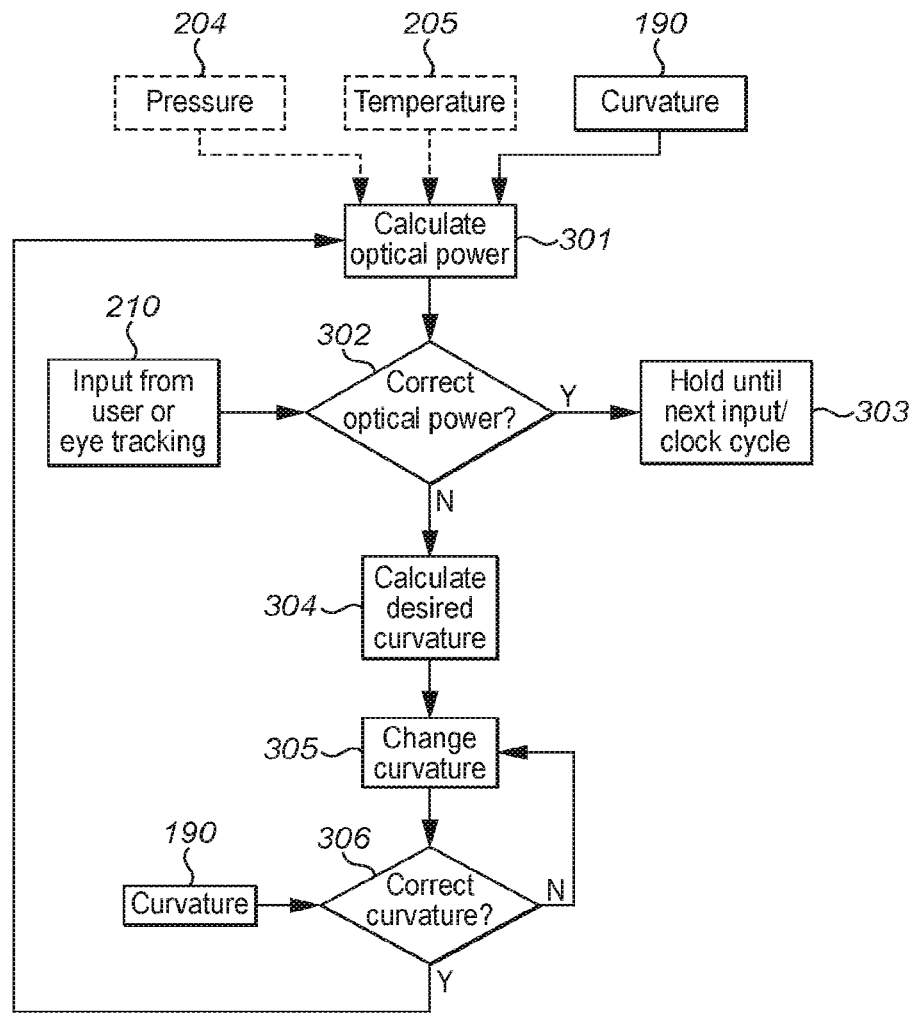
FIG. 23 is a flow diagram which illustrates process steps of the electronic control system of FIG. 22 for controlling operation of the variable focusing power lens assembly of FIGS. 7-21.

A flowchart showing the operation of the electronic control system 200 according to the machine code instructions stored in the memory of the microcontroller 202 is shown in FIG. 23.

Sensor signals from the curvature sensors 190 and pressure and temperature sensors 204, 205, which represent respectively the curvature ($1/R_{Btz}$) of the discrete regions of the support ring 159 in the plane defined by the z-axis and a tangent to the support ring 159 where the curvature sensors 190 are located and the pressure and temperature of the fluid 160 in the envelope are received in the microcontroller 202 which, in step 301, executes the instructions stored in the memory device to calculate a measured optical power of the lens assembly 100 based on the variable focusing power provided by the membrane 155 and the fixed focussing power of the front face 112 of the front lens 110 (assuming the fluid 160 is index-matched to hard front lens 110. If the refractive index of the fluid 160 is not matched to that of the front lens 110, then the measured optical power of the lens assembly 100 will be based on the variable focusing power provided by the membrane 155, the fixed focusing power of an interface between the fluid 160 and the rear face 114 of the front lens 110, and the front face 112 of the hard lens 110).

In step 302, the microcontroller 202 receives an input signal from the input device 210 representing a target focusing power of the lens assembly 100 and checks whether the measured focusing power is equal to the target focusing power. If the target focusing power according to the input device 210 is equal to the measured focusing power of the lens assembly 100, no changes are made to the lens assembly 100, and the control system waits in step 303 for the next clock cycle or input from the input device 210.

If the measured focusing power of the lens assembly 100 is not equal to the inputted target focusing power, the microcontroller 202 calculates the correct curvature ($1/R_{Btz}$) for each of the curvature sensors 190 in step 304 to provide the target focusing power.

In step 305, the microcontroller 202 transmits instructions to the curvature controllers 170 to adjust the local curvature of the support ring 159 in the vicinity of each curvature sensor 190 to achieve the correct optical power.

Using inputs from the curvature sensors 190 in step 306, the microcontroller 202 checks whether the curvature of the support ring 159 at each curvature sensor 190 is correct. If the curvature is incorrect at one of more of the curvature sensors 190, steps 305 and 306 are repeated until the curvature ($1/R_{Btz}$) at each curvature sensor 190 is correct. At the next clock cycle, the process then returns to step 301.

The present invention therefore provides a variable focusing power lens assembly 100 in which the focusing power of the optical surface formed by the distensible membrane 155 that is held under tension around its edge by the support ring 159 can be controlled by the use of piezoelectric curvature controllers 170 that are attached to the support ring 159 at one or more discrete locations, and the curvature controllers 170 can be operated to ensure the correct focusing power is achieved by measuring the local curvature ($1/R_{Btz}$) of the support ring 159 at the one or more discrete locations using curvature sensors 190.

EXAMPLE 2: VARIABLE FOCUSING POWER LENS ASSEMBLY USING LINEAR ACTUATORS AS CURVATURE CONTROLLERS

Figure 24:
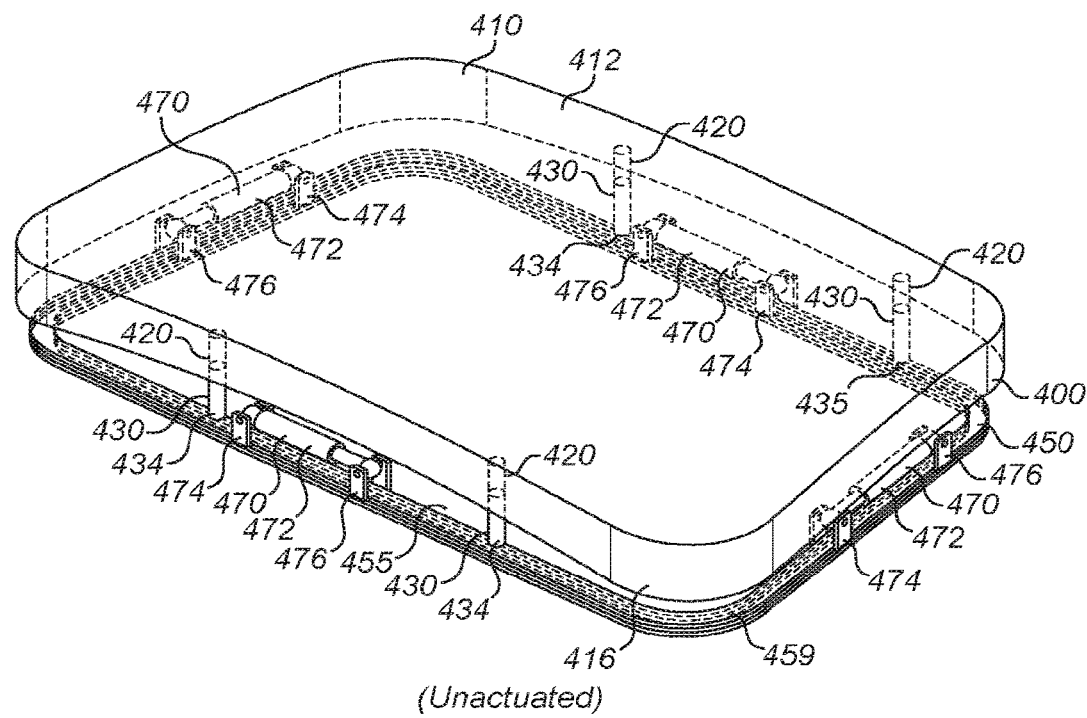
FIG. 24 is a perspective view from above and to one side of the front of another variable focusing power lens assembly in accordance with the present invention for use in a pair of glasses.
Figure 25:
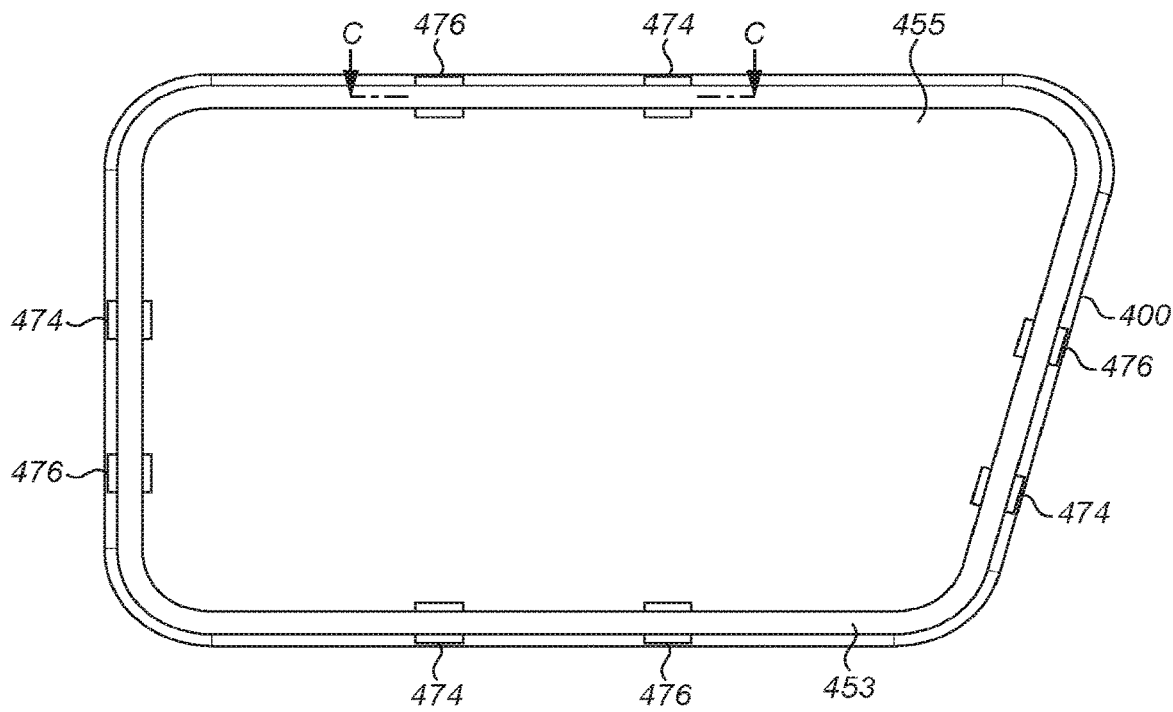
FIG. 25 is a rear elevation of the variable focusing power lens assembly of FIG. 24.

As described above, the variable focusing power lens assembly 100 of Example 1 uses a plurality of piezoelectric curvature controllers 170 for controlling the curvature of the support ring 159 that holds the membrane 155 under tension around its edge. A different variable focusing power lens assembly 400 in accordance with the present invention is shown in FIG. 24 in an unactuated state and in FIG. 27 in an actuated state.

The lens assembly 400 of the present embodiment is similar in many respects to the lens assembly 100 of Example 1, and parts of the lens assembly 400 of the present embodiment which correspond to similar parts in the lens assembly 100 of Example 1 are given similar reference numerals in the drawings but prefixed by the numeral "4" instead of the numeral "1" and are not described again in detail here.

Thus, the lens assembly 400 of the present embodiment includes a hard front lens 410, which comprises a front face 412, a rear face 414 and a peripheral side surface 416 and defines an optical axis (not shown), and a membrane subassembly 450, which comprises an optically clear membrane 455 that is held under tension around its edge by a bendable support ring 459 comprising front and rear ring elements 452, 453, and which is mounted to the rear face of the front lens 410 by a flexible side wall (not shown) that is bonded to the side surface 416 of the front lens 410 and to the membrane subassembly 450, with a collapsible intermediate portion between the rear face 414 of the front lens 410 and the support ring 459. The support ring 459 is spaced from the rear face 414 of the front lens 410 by a plurality of support pins 430 which are spaced around the periphery of the front lens 410 as shown in FIG. 24 and are fixedly secured in corresponding holes 420 formed in the front lens 410. Bevelled rear ends 434 of the support pins 430, which all terminate in a common plane, contact the front ring element 452 of the membrane subassembly 450 at spaced hinge points around the support ring 459. The front lens 410, the sidewall and membrane subassembly 450 define an interior cavity of fixed volume, which is filled with an optically clear, refractive fluid 460, which is substantially incompressible.

Figure 26:
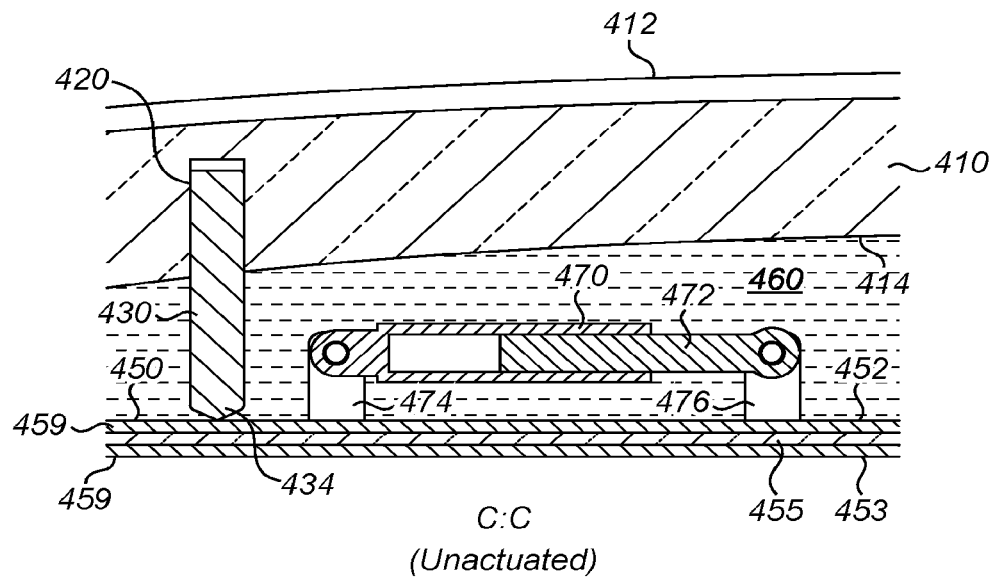
FIG. 26 is a sectional view of part of the lens assembly of FIGS. 24 and 25 on the line C-C of FIG. 25, which shows a linear actuator as a curvature controller.
Figure 27:
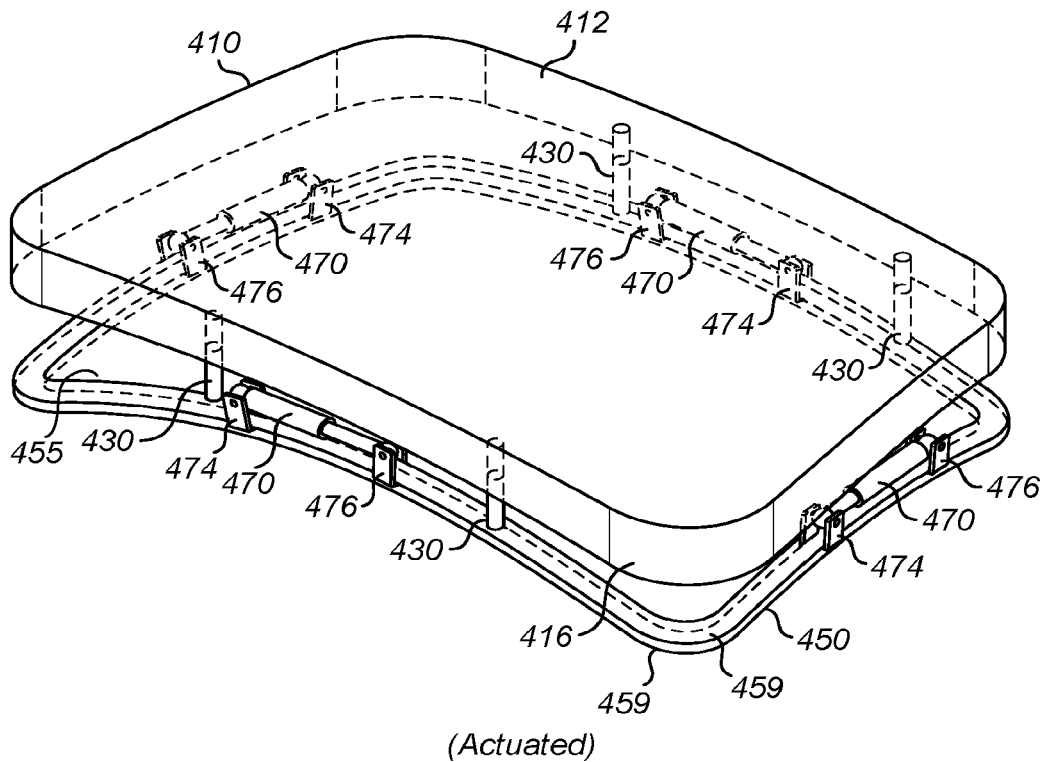
FIG. 27 is another perspective view of the lens assembly of FIGS. 24 and 25 in an actuated state.
Figure 28:
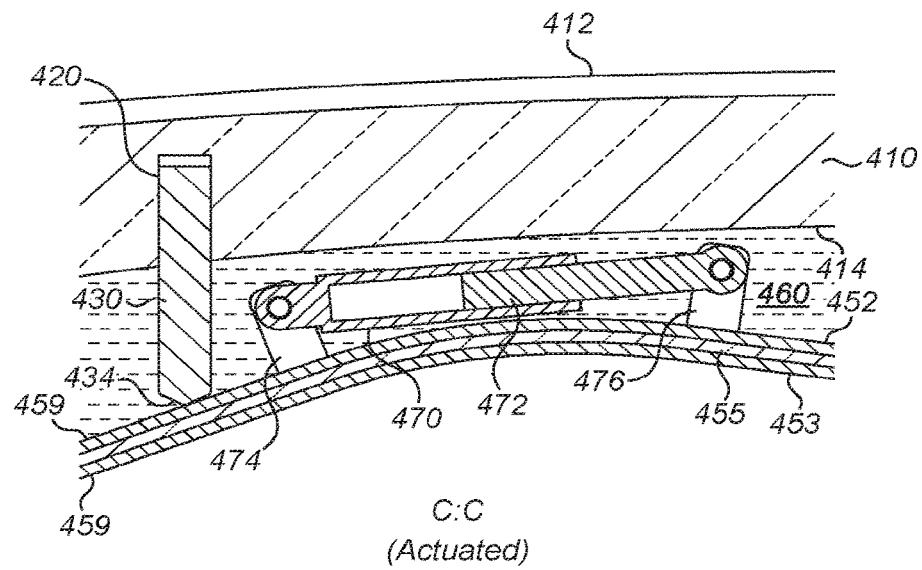
FIG. 28 is another cross-sectional view of the part of the lens assembly of FIG. 26 with the lens assembly in the actuated state.

The lens assembly 400 of the present embodiment also includes a plurality of curvature controllers 470 which are attached to different respective discrete regions of the support ring 459 for controlling the local curvature of the support ring 459 in those regions. The curvature controllers 470 are conveniently mounted in front of the front face of the front ring element 452 as shown in FIGS. 24 and 27. However, unlike the lens assembly 100 of Example 1, in which the curvature controllers comprise multi-layer piezoelectric bending actuators, the curvature controllers 470 of the present embodiment comprise selectively operable linear actuators, as best shown in FIGS. 26 and 28.

Each of the linear actuators 470 includes a piston 472 that is pivoted at each end to a front end of a respective tab 474, 476, an opposite rear end of which is fixedly secured to the support ring 459. The linear actuator 470 is dimensioned such that it is contained within the confines of the support ring 459, i.e. it does not protrude beyond the inner and outer edges of the support ring 459. It will be appreciated that extension or contraction of the linear actuator 470 will cause the front ends of the respective tabs 474, 476 to move away from or towards one another, while the rear ends of the tabs 474, 476 are constrained in their separation in the circumferential direction of the support ring 459, which produces bending of the support ring 459 in a direction substantially orthogonal to the plane of the membrane 455 as shown in FIGS. 27 and 28. In this way, the linear actuators 470 of the lens assembly 400 of the present embodiment serve essentially the same purpose as the piezoelectric curvature controllers 170 of the lens assembly 100 of the Example 1 above and can be operated to control the profile of the support ring 459 and hence the boundary of the membrane 455. The linear actuators 470 thus serve as curvature controllers for controlling the curvature of the support ring 459 in an (x,y)-plane that is substantially parallel to the optical axis of the lens assembly 400 and tangential to the support ring 459 and may be individually addressable by a suitable electronic control system (not shown).

The pistons 472 may include extension sensors (not shown) to measure the membrane boundary profile. Alternatively (or in addition) piezoelectric curvature sensors of the kind described in relation to Example 1 above may be used to send sensor signals to the control system.

As described above, further alternatives to piezoelectric curvature controllers or linear actuators for controlling the local curvature of the support ring 459 at a plurality of discrete regions thereof include SMA wires or wire arrays, electroactive polymer actuators, piezo squiggle motors, solenoids and the like.

EXAMPLE 3: VARIABLE FOCUSING POWER LENS ASSEMBLY WITH ACTIVE Z-CONTROL AND CURVATURE SHAPE REFINEMENT

Figure 29:
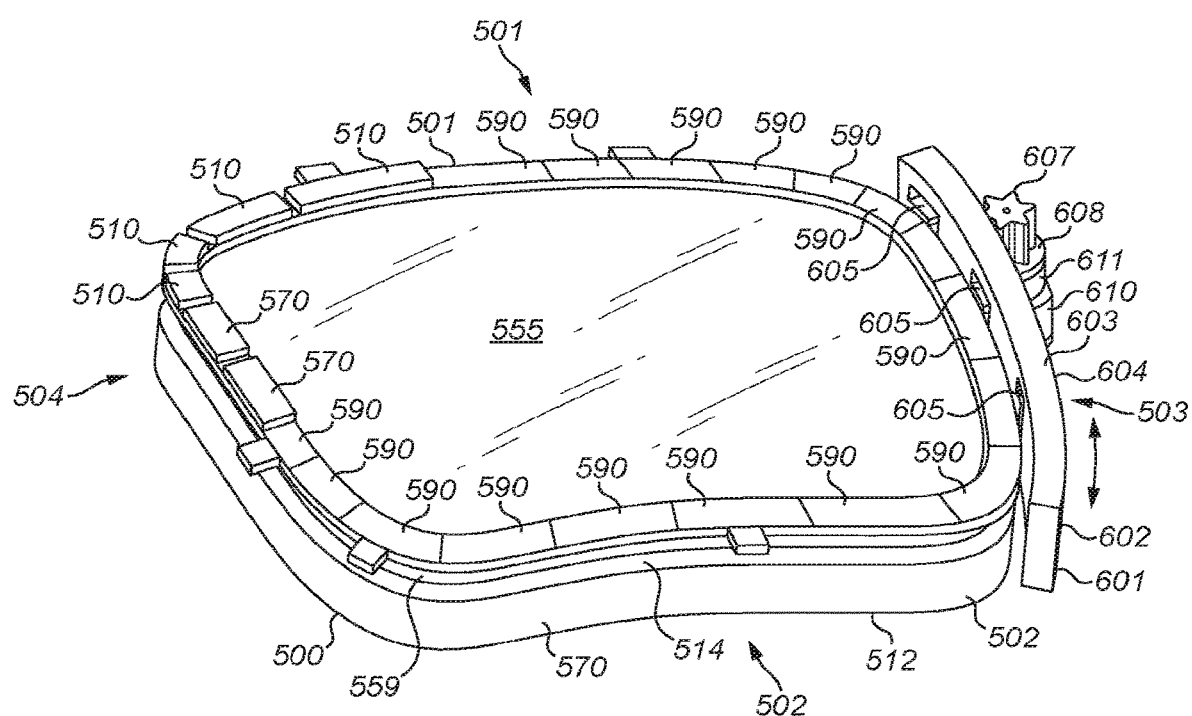
FIG. 29 is a perspective view from below and to the right side of the front of yet another variable focusing power lens assembly in accordance with the invention which is suitable for use in a pair of glasses.

FIG. 29 shows another variable focusing power lens assembly 500 in accordance with the present invention. As with the embodiment of Example 2 above, the lens assembly 500 of the present embodiment shares a number of features in common with the lens assembly 100 of Example 1, and parts of the lens assembly 500 of the present embodiment that have similar counterparts in the lens assembly 100 of Example 1 are indicated in the accompanying drawings by similar reference numerals, prefixed with numeral "5" instead of "1" and need not be described again in detail here. The lens assembly 500 also has a number of features in common with the lens assembly disclosed by WO 2013/144592 A1.

The lens assembly 500 includes a hard lens 510 for use in a pair of eyeglasses of the kind shown in FIG. 1. However, unlike the lens assemblies 100, 400 of Examples 1 and 2, the hard lens 510 of the present embodiment forms a rear lens having a rear face 512 and a front face 514. The rear lens 510 may have a positive or negative focusing power. In the present embodiment, the rear surface 512 of the hard lens 510 has a fixed negative focusing power which is suitable for use in correcting myopia for example. The rear lens 510 is a meniscus lens in which the rear face 512 is concave and the front face 514 is convex. Numerous suitable optically clear, refractive materials that are used for making ophthalmic lenses are available to those skilled in the art and may be used for making the rear lens 510.

Figure 30:
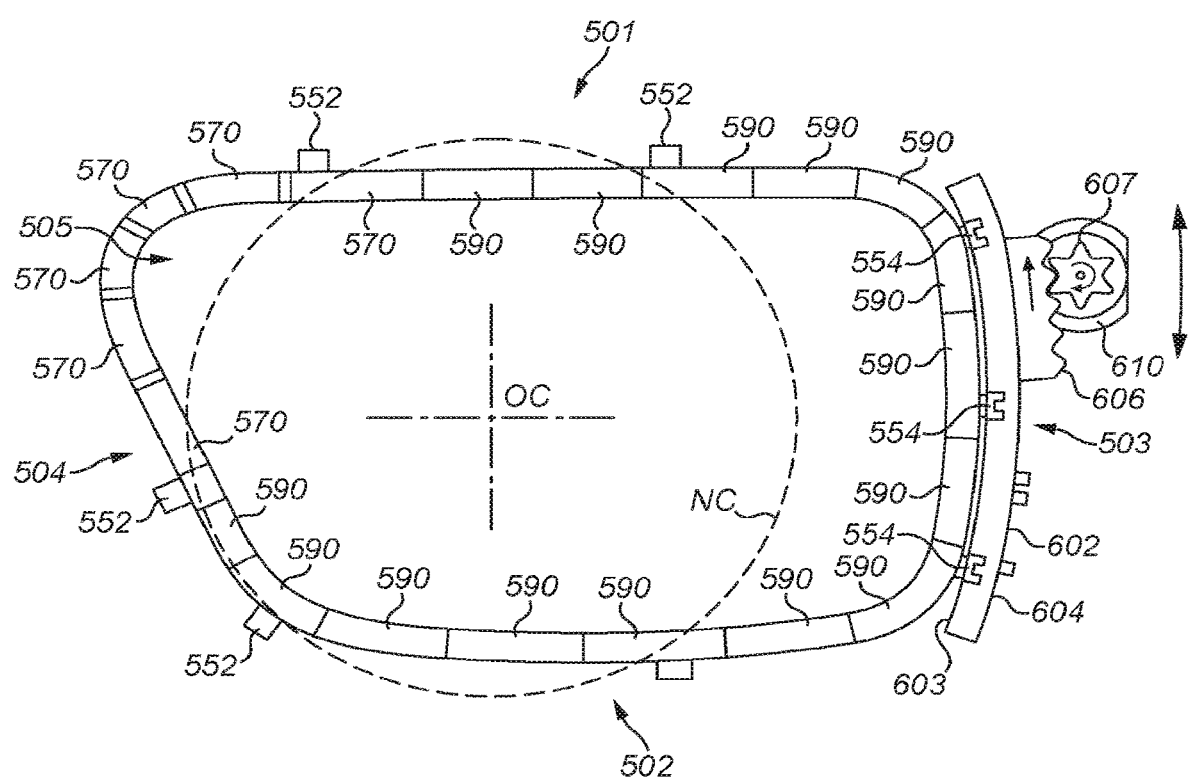
FIG. 30 is a front elevation of the lens assembly of FIG. 29.

As best seen in FIG. 30, the hard lens 510 is non-round. As with Examples 1 and 2 above, the precise shape of the hard lens is unimportant, and in different embodiments it may be round or non-round. In the present embodiment, the hard lens 510 has a generally rectangular shape of a kind that is commonly found in eyeglasses. Specifically, the lens assembly 500 of the present embodiment is suitable for use as a left lens in a pair of glasses and has two long sides 501, 502 and two short sides 503, 504. As best shown in FIG. 30, the two long sides 501, 502 form respectively a top and bottom of the lens assembly 500, while the short sides 503, 504 form left and right sides of the lens assembly 500. When fitted in a spectacles frame, the left side 503 is disposed closer to the wearer's temple, while the right side 504 is disposed closer to the wearer's nose. The hard lens 510 in the present embodiment is shaped to define a converging nasal region 505 juxtaposed a corner between the top 501 and right side 504 of the assembly 500. It will be noted from FIG. 30 especially that the outline of the hard lens 510 is more curved in its corners between adjacent sides 501, 503; 502, 503; 502, 504 and is most curved in the corner with the nasal region 505, between the sides 501 and 504.

The hard lens 510 may be firmly mounted in a chassis structure (not shown) for the lens assembly 500. The chassis structure may have a frame-like structure which surrounds the lens assembly 500 around its periphery without obscuring a major part of the hard lens 510. The chassis structure may overlap a peripheral region of the hard lens 510. The chassis structure may include front and rear parts which can be joined together, for example in the manner of a clamshell, using screws or other fastening means, or by snap fitting, to enclose the lens assembly 500. The rear lens 510 may be fixedly secured in the rear part of the chassis structure and the front part may be positioned over the front face 514 of the rear lens 510 and other components of the lens assembly 500 supported thereon, as described in more detail below, to support and protect the lens assembly 500 and to facilitate its mounting as an integral unit to the spectacles frame. The front part may include an optically clear front cover plate to protect the front of the lens assembly 500. A suitable chassis structure of this kind is disclosed by WO 2013/144592 A1.

Figure 31:
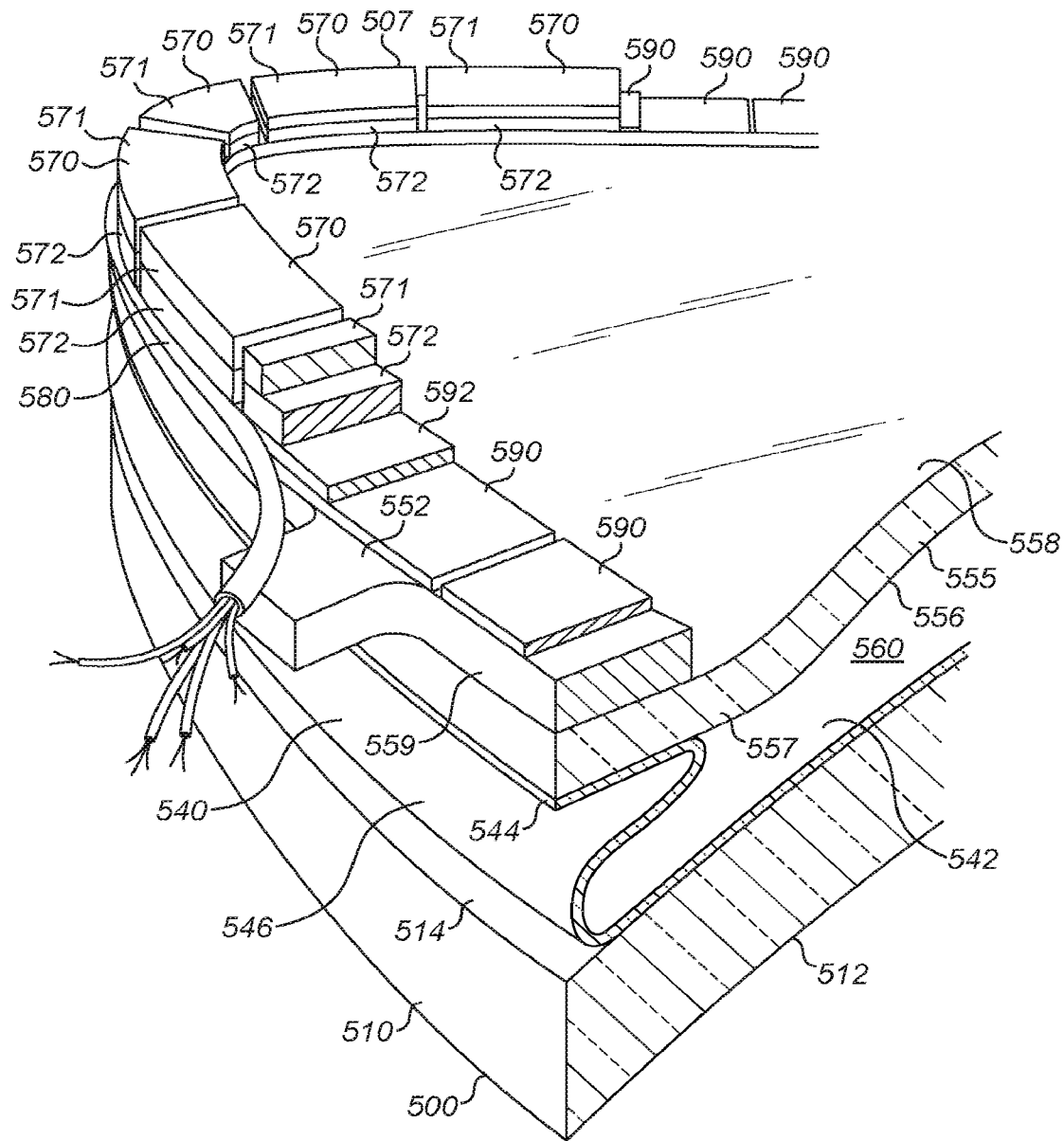
FIG. 31 is an enlarged perspective view of part of the lens assembly of FIGS. 29 and 30 which is cutaway to show details of the lens assembly.
Figure 32:
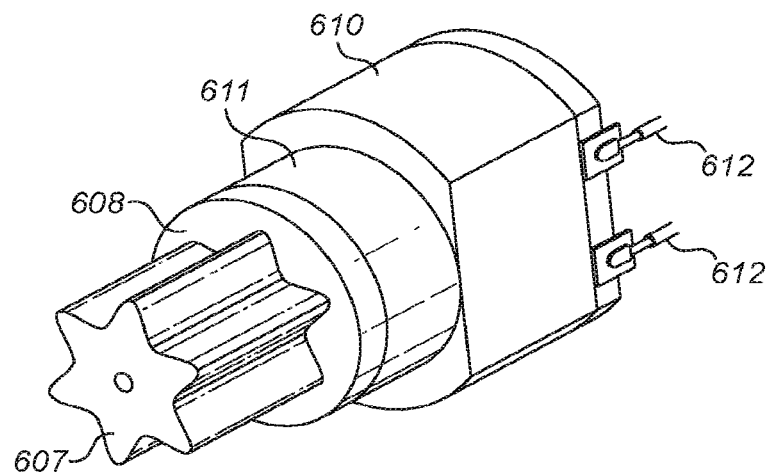
FIG. 32 is a perspective view of a gear motor assembly which includes an angular position sensor for use in a sliding cam actuator of the lens assembly of FIGS. 29-31.

As seen most clearly in FIG. 31, the front face 514 of the rear lens 510 carries a dish-shaped receptacle 540 (or "bag") comprising a rear wall 542 having a shape that is similar to the shape of the front face 514 of the rear lens 510 and a collapsible peripheral side wall 546 that extends forwardly from the rear wall 542 and terminates in a peripheral lip 544. In the present embodiment, the dish-shaped receptacle 540 is made from an optically clear, flexible thermoplastic polyurethane (e.g. Tuftane®, which is commercially available from Messrs. Permali Gloucester Ltd, Gloucester, UK) and its rear and side walls 542, 546 are about 50 µm thick, but other transparent materials, especially transparent elastomers, may be used and the thickness adjusted accordingly.

The rear wall 542 of the dish-shaped receptacle 540 is bonded contiguously to the front face 514 of the rear lens 510 by means of a transparent pressure-sensitive adhesive (PSA) such, for example, as 3M® 8211 adhesive. In the present embodiment, a layer of PSA about 25 µm thickness is used, but this may be varied as required.

The peripheral lip 544 of the dish-shaped receptacle 540 is joined to a rear surface 556 of a distensible membrane 555 having a non-round shape that corresponds to the shape of the rear lens 510.

The membrane 555 is formed from a sheet of a thermoplastic polyurethane (e.g. Elastollan® 1185A10, which is commercially available from Messrs. BASF) and has a thickness of about 220 µm. Other suitable materials that may be used for the membrane 555, as well as the other components of the lens assembly 500, are disclosed by WO 2017/055787 A2. In addition to the rear surface 556, the membrane 555 also has a front surface 558 and is held under tension around its periphery by a resiliently bendable support ring 559. The front surface 558 of the membrane 555 forms a front optical surface for the lens assembly 500, with the overall focusing power of the lens being determined by a combination of the curvature of the front surface 558 of the membrane 555 and the rear surface 512 of the rear lens 510. In it undeformed state the membrane 555 defines an (x,y)-plane that is substantially normal to an optical axis of the lens assembly 500.

The support ring 559 is fabricated from a sheet of stainless steel and has a thickness of about 0.55 mm, but more generally the ring may have a thickness in the range about 0.50-0.60 mm, or the support ring may comprise a stack of two or more ring elements instead of a single ring. The front surface 558 of the membrane 555 is bonded to the support ring 559 with a light curable adhesive (e.g. Delo® MF643 UV curing epoxy adhesive) or other means and is held at a line tension of at least about 180 Nm$^{-1}$.

The lip 544 of the dish-shaped receptacle 540 is bonded to a peripheral region 557 of the rear surface 556 of the membrane 555 using a suitable adhesive (e.g. Delo® MF643 UV curing epoxy adhesive) or other means such, for example, as ultrasonic welding, laser welding and the like, such that the membrane 555 is sandwiched between the lip 544 of the dish-shaped receptacle 540 and the support ring 559.

In other embodiments of the invention, the support ring 559 may comprise two or more ring elements (not shown) in a manner similar to Example 1 above. For example, the membrane 555 may be sandwiched between two similar ring elements as described, for example, in WO 2013/144533 A1.

The rear and side walls 542, 546 of the bag 540 and the membrane 555 form a sealed envelope having an interior cavity that is filled with a sensibly incompressible, optically clear, refractive fluid 560 of the kind described in relation to Example 1 above. In the present embodiment, the membrane 555 is formed from a polyether polyurethane (e.g. Elastollan® 1185) and the fluid 560 is a phenylated siloxane, e.g. pentaphenyltrimethyltrisiloxane. The refractive indexes of the membrane material and fluid are suitably the same or substantially the same and are at least 1.5.

Suitable methods for assembling the lens assembly 500 with the membrane 555 under tension are disclosed by WO 2017/055787 A2.

As best seen in FIG. 30, the support ring 559 is formed on its top, bottom and right sides 501, 502, 504 with a plurality of peripherally spaced, outwardly protruding tabs 552. Each of these tabs 552 is connected to the chassis structure to hold the tabs 552 in a fixed position relative to the chassis structure and relative to the hard lens 510. The tabs 552 are interengaged with the chassis structure in such a manner as to permit tilting and pivoting of the support ring 559 at each tab 552. The support ring 559 is thus hinged to the chassis structure at a hinge point located at each tab 552. The number and positions of the tabs 552 are dependent on the shape of the lens assembly 500 and the desired degree of accuracy for shaping the membrane 555 into a desired 3D form as described below. In the present embodiment, there are five tabs 552 two of the tabs 552 are positioned on the top 501 of the support ring 559; one tab 552 is positioned on the bottom 502 of the support ring 559; one tab 552 is positioned on the right side 504 of the support ring 559; and one tab 552 is positioned in the corner between the bottom 502 and right side 504 of the support ring 559. In other embodiments, there may be more or fewer tabs 552 as required. In general, there should be a minimum of at least three tabs 552 as described in WO 2013/144592 A1. The precise locations of the hinge points are described in more detail below.

The left side 503 of the support ring 559 is also formed with a plurality of outwardly protruding tabs 554 which engage with a sliding cam actuator 601 at respective actuation points as described below. In the present embodiment, there are three tabs 554, but in other embodiments there may be fewer than three or more than three such tabs 554 as required.

Intermediate the hinge points and actuation points defined by the tabs 553, 554 respectively, the support ring 559 is free to bend locally towards or away from the rear lens 510 on a z-axis that is substantially normal to the (x,y)-plane of the undeformed membrane 555, with the side wall 546 of the dish-shaped receptacle 540 folding on itself or extending respectively to allow such movement.

The sliding cam actuator 601 comprises an elongate cam body part 602 which is disposed juxtaposed the left side 503 of the support ring 559 and extends between the top 501 and bottom 502 of the assembly 500 as shown in FIG. 30. The cam body part 602 is arranged to oscillate upwards and downwards on the z-axis relative to the support ring 559 within a suitable track or guides (not shown) formed in the chassis structure as indicated by the double-headed arrows in FIGS. 29 and 30.

Figure 33:
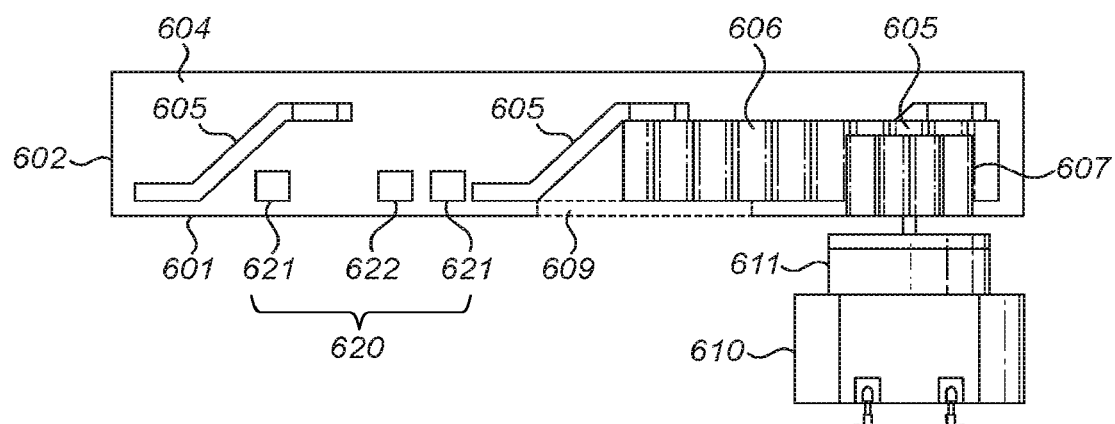
FIG. 33 is a left side elevation of the sliding cam actuator of the lens assembly of FIGS. 29-31.

The cam body part 602 has an inner face 603 which faces inwardly towards the left side of the support ring 559 and an opposite outer face 604. The inner face 603 of the cam body part 602 is formed with three spaced "escalator" cam tracks 605 as best shown in FIG. 33. The cam tracks 605 may extend all the way through the cam body part 602 as shown, or they may extend only part of the way through the cam body part 602, being open only on the inner face 603. Each of the escalator cam tracks 605 receives a corresponding one of the tabs 554 on the left side of the support ring 559, and it will be appreciated that reciprocal movement of the cam body part 602 upwards and downwards relative to the support ring 559 causes active displacement of the support ring 559 at the actuation points defined by the tabs 554 forwards and backwards relative to the rear lens 510.

For this purpose, the outer face 604 of the cam body part 602 carries a short rack 606 which is engaged with a pinion 607 that is operably connected to an electric motor 610 through a gearbox 611. The electric motor 610 is provided with electrical connections 612 for connecting to a power supply (not shown). In the present embodiment, the pinion 607 is also connected to an angular position sensor 608 for monitoring the angular position of the pinion 607 and thus, indirectly, the position of the cam body part 602. The position of the cam body part 602 is related to the position of the support ring 559 at the actuation points.

In another embodiment, as shown in FIG. 33, the angular position sensor 608 may be omitted, and the cam body part 602 may be provided instead with a linear sensor 609 for directly detecting the position of the cam body part 602 relative to the chassis structure.

Figure 34:
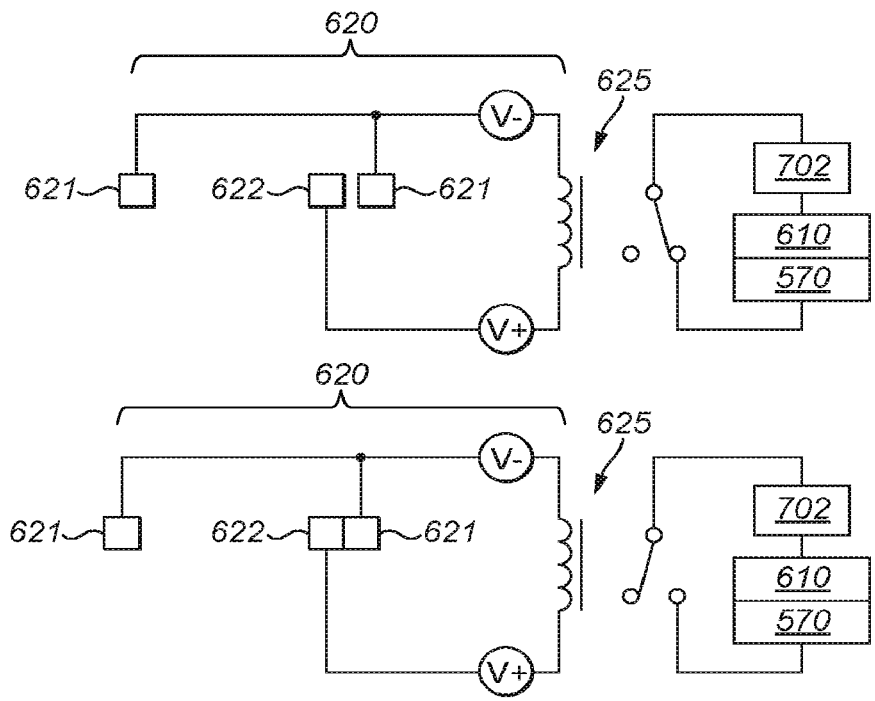
FIG. 34 is a schematic diagram showing operation of a limit switch associated with the sliding cam actuator of FIG. 33.

In the present embodiment, the sliding cam actuator 601 is also fitted with a limit sensor 620 which is represented schematically in FIG. 34. The limit sensor 620 includes two moving contacts 621 which are carried on the outer face 604 of the cam body part 602 and a static contact 622 which is mounted on an inner face of the chassis structure. The moving contacts 621 and static contact 622 thus form a double throw limit switch. A potential difference is applied between the moving contacts 621 and the static contact 622, and both poles of the double throw switch are connected in series with a relay switch 625, which is normally closed as shown in the top half of FIG. 34, but is opened as shown in the lower half of FIG. 34 upon contact of one of the moving contacts 621 with the static contact 622. The limit sensor 620 is used as described in more detail below to control operation of an electronic control system 700.

Active displacement of the support member 559 at the actuation points defined by the tabs 554 towards or away from the rear lens 510 causes redistribution and a change of pressure of the fluid 560 within the cavity between the membrane 555 and the rear wall 542. In particular, driving the tab is 554 rearwards towards the rear lens 510 causes an increase in pressure of the fluid 560 and redistributes the fluid from a peripheral region of the cavity adjacent the sidewall 546 to a central region of the cavity, resulting in forwards distension of the membrane 555 on the z-axis. Similarly, movement of the tabs 554 forwards, away from the rear lens 510 causes a reduction in the pressure of the fluid 560 in the cavity and displacement of the fluid 560 from the central region of the cavity outwardly to the peripheral region, resulting in rearwards contraction of the membrane 555 on the z-axis.

To form an optically useful surface, the membrane 555 must distend or contract to form a spherical surface having an optical centre represented by OC in FIG. 30, or a surface defined by one or more Zernike polynomials of the kind used in ophthalmology to define an optical lens surface. For instance, the membrane 555 may be required to distend to form a composite surface that has a spherical component and a toric component for correction of distance and astigmatism refractory errors. Given the non-round shape of the lens assembly 500, the profile of the support ring 559 must change as the membrane is distended such that it corresponds to the 3D form defined by the one or more Zernike polynomials where it intersects with the periphery of the membrane 555. In the case of spherical deformation of the membrane 555, the support ring 559 must bend to form a projection of itself onto multiple spheres of decreasing radius with increasing distension. For a membrane surface that is defined by a series of Zernike polynomials, the support ring 559 must similarly form a series of projections of itself onto multiple surfaces defined by the series of Zernike polynomials. Given the shape of the membrane 555, one or more discrete regions of the support ring 559 must bend locally.

Further, in the case of spherical deformation of the membrane 555, a notional volume-conserving neutral circle NC exists that is common across all state of distension of the membrane 555 as shown in FIG. 30. The neutral circle NC is defined by the intersection of a plane at a fixed distance from the rear lens 510 with the membrane 555, such that the volume of fluid 560 bounded by the plane and membrane is always equal above and below that plane. In other words, the volume of fluid 560 inside the neutral circle NC is equal to that displaced outside of it owing to distension or contraction of the membrane 555. The centre of the neutral circle is both the point of maximum distension of the membrane and the optical centre OC of the membrane 555. In the case of distention according to a series of Zernike polynomials that includes a spherical component and a toric component, there is a neutral ellipse instead of a neutral circle. As indicated in FIG. 30, the tabs 552 are located at or close to where the neutral circle NC crosses the support ring 559, since these locations remain at a fixed distance from the rear lens 510 regardless of the state of distension of the membrane, they are suitable hinge points for coupling the support ring 559 to the chassis structure to reinforce the support ring 559 against unwanted bending modes as described in WO 2013/144592 A1.

In the lens assembly 500 of the present embodiment, therefore, the state of distension of the membrane 555 can be controlled by active displacement of the support ring 559 towards or away from the rear lens 510 on the z-axis at the actuation points defined by tabs 554 using the sliding cam actuator 601. Further control over the distended form of the membrane 555 is provided by a plurality of curvature controllers 570 and curvature sensors 590 of the kind described in relation to Example 1 above that are attached to the support ring 559 as shown in FIGS. 29-31.

In the present embodiment, six curvature controllers 570 are provided at the nasal region 505 of the support ring 559 between the top 501 and right side 504 of the lens assembly 500, since passive bending of the support ring 559 in this region is more difficult to achieve by active displacement at the actuation points using the sliding cam actuator 601, in view of its distance from the actuation points 554 and the high degree of curvature of the support ring 559 in the nasal region 505. In other embodiments, more or fewer curvature controllers 570 may be used at one or more discrete regions of the support ring 559 around the support ring 559. In some embodiments, curvature controllers 570 may be provided all the way round the support ring 559. Adjacent curvature controllers 570 may be spaced apart from one another or may be arranged contiguously.

The curvature controllers of 570 have a similar structure to the curvature controllers 170 of the lens assembly 100 of Example 1 above. Thus, each curvature controller 570 comprises a multilayer piezoelectric bending actuator which consists of a plurality (two in the present embodiment) of layers of piezoelectric material 571, 572, which are mounted to a substantially flat surface of the support ring 559, such that they do not extend beyond inner or outer boundaries of the ring 559, and are provided with electrical connections (not shown) to an electronic bus 580 as shown in FIG. 31. The application of the differential electrical field across the layers of piezoelectric material 571, 572 of each bending actuator causes the bending actuator to bend in a plane (Btz) defined by the optical axis (z) of the lens assembly 500 and a tangent (t) to boundary (B) of the support ring 559, thereby causing corresponding local bending of the support ring 559 in the region of the curvature controller 570.

The support ring 559 also carries a plurality of curvature sensors 590, each of which also consist of a layer of piezoelectric material that is connected to the electronic bus 580 as described above in relation to Example 1. In the embodiment shown, the curvature sensors 590 are arranged between the support ring 559 and the curvature controllers 570 and are insulated therefrom by a continuous layer of insulating material 592. In the lens assembly 500 of the present embodiment, curvature sensors 590 are arranged all the way round the support ring 559 closely adjacent one another as shown in FIGS. 30 and 31, but in other embodiments, curvature sensors 590 may be provided only in one or more discrete regions of the support ring 559, for example where there are curvature controllers 570.

Figure 35:
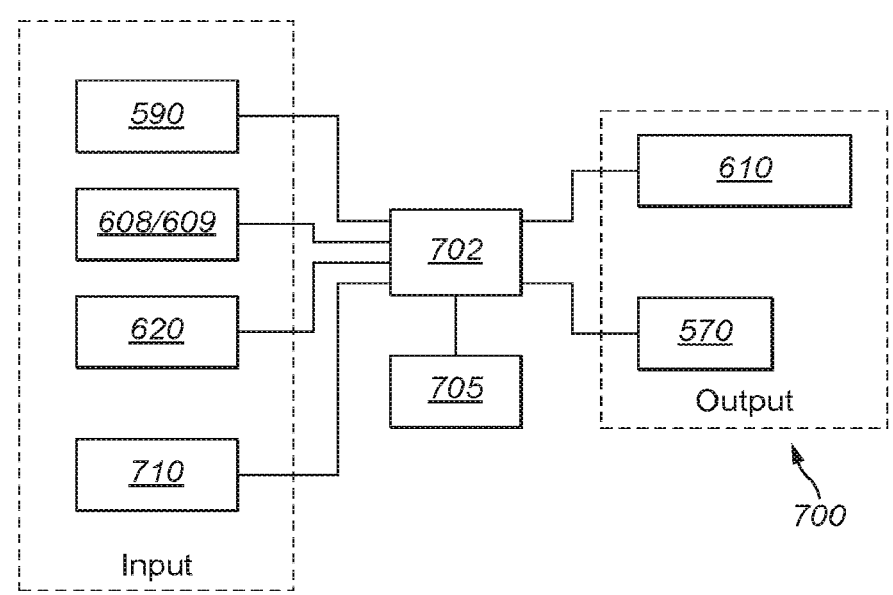
FIG. 35 is a schematic diagram of an electronic control system for the lens assembly of FIGS. 29-31.

FIG. 35 shows an electronic control system 700 for the lens assembly 500, which includes a microcontroller 702 comprising a processor and a memory device similar to Example 1 above. The memory device stores computer-readable machine code that can be executed by the processor for operating the lens assembly 500. The memory device also stores data relating settings of the sliding cam actuator 601 and the curvature of the discrete regions of the support ring 559 where curvature sensors 590 are located to focusing powers of the lens assembly 500. The microcontroller 702 is arranged to receive a first signal from a user controllable input device 710 representing a specific target focusing power, a second input signal from the angular position sensor 608 or linear position sensor 609, a third input signal from the limit sensor 620 on the sliding cam actuator 601 and one or more fourth input signals from the curvature sensors 590 on the support ring 559. The microcontroller 702 is also arranged to output a first control signal to the electric motor 610 and one or more second control signals to the curvature controllers 570. Electrical power is provided by a power supply 705, which may be accommodated, for example, in the chassis structure mentioned above or within a frame of a pair of glasses to which the lens assembly 500 is fitted.

Operation of the lens assembly 500 of the present embodiment is generally similar to the operation of the lens assembly 100 of Example 1 described above. The microcontroller 702 continually calculates a measured focusing power of the lens assembly, particularly the variable focusing power provided by the membrane 555, from the second input signal received from the angular position sensor 608 or linear position sensor 609 and the third input signals received from the curvature sensors 590 and compares this with the target focusing power represented by the first input signal. If the measured focusing power of the lens assembly 500 is not equal to the target focusing power, the microcontroller transmits first and second control signals respectively to the sliding cam actuator 601 and one or more curvature controllers 570 for actively displacing the tabs 554 at the actuation points on the left side 503 of the support ring 559 towards or away from the rear lens 510 and adjusting the local curvature of the support ring 559 in the vicinity of the one or more curvature controllers 574 causing distension or contraction of the membrane 555 to the correct target focusing power and adjusting the profile of the support ring 559 to match the 3D shape of the one or more Zernike polynomials represented by the distended membrane 555 where it intersects the support ring 559.

The present invention therefore provides a compression-type fluid-filled lens assembly 500 in which the distension of a membrane 555 is controlled by a combination of active displacement of a support ring 559 towards or away from a hard lens 510 at one or more actuation points 554, holding the support ring 559 at a fixed distance from the hard lens 510 at a plurality of hinge points 552, and by actively controlling the curvature of the support ring 559 at one or more discrete regions thereof using piezoelectric curvature controllers 570.

EXAMPLE 4: AUGMENTED REALITY HEADSET

Figure 36:
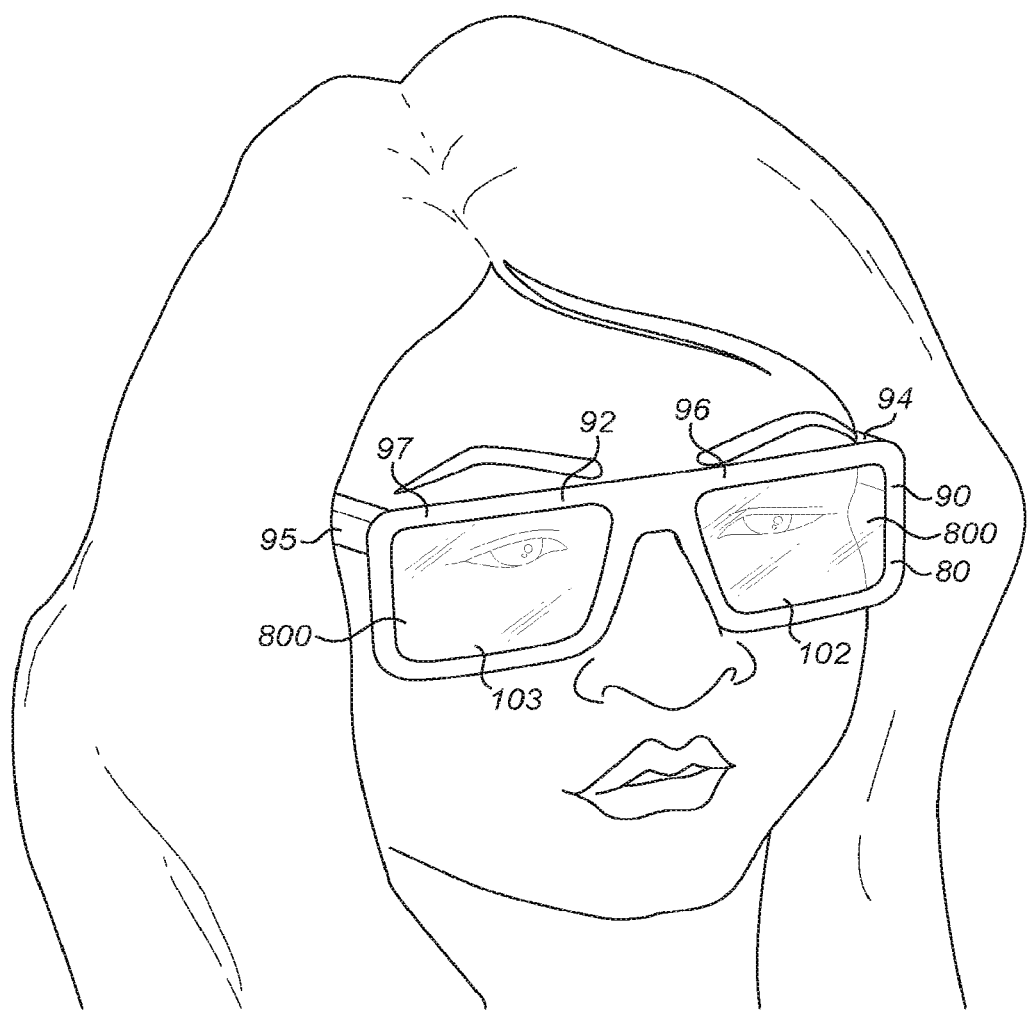
FIG. 36 is a perspective view from above and to the right of the front of an augmented reality headset worn by a user and comprising a frame and two right- and left-hand display modules in accordance with the present invention.

FIG. 36 shows an augmented reality headset 80 in accordance with the invention worn by a user. The headset 80 comprises a frame 90 having a frame front 92 and left and right temple arms 94, 95 that are similar to those found in a pair of spectacles. The frame front 92 comprises left and right rim portions 96, 97, each of which defines an aperture 102, 103 that accommodates an augmented reality display module (AR module) 800.

Figure 37:
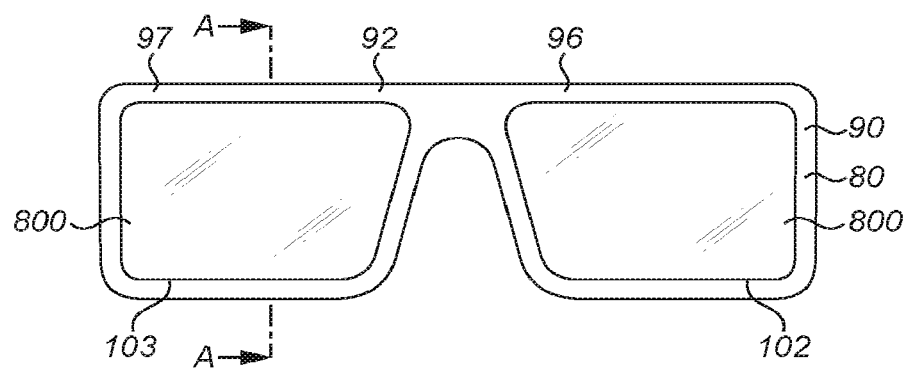
FIG. 37 is a front elevation of the augmented reality headset of FIG. 36.
Figure 38:
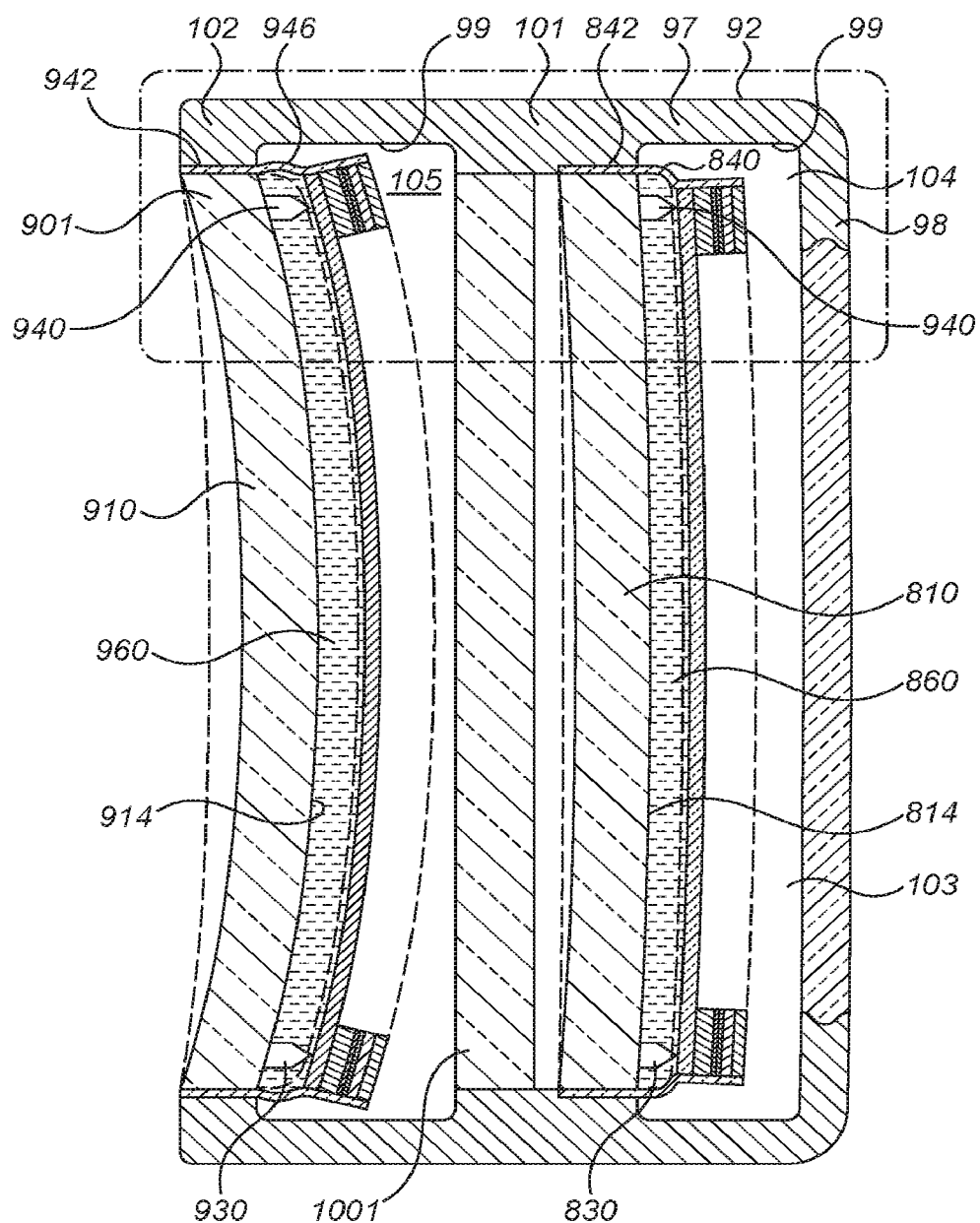
FIG. 38 is a cross-sectional side view on the line A-A of FIG. 37, which shows the right-hand display module with two front and rear variable focusing power lens assemblies of the present invention and an interposed waveguide display.
Figure 39:
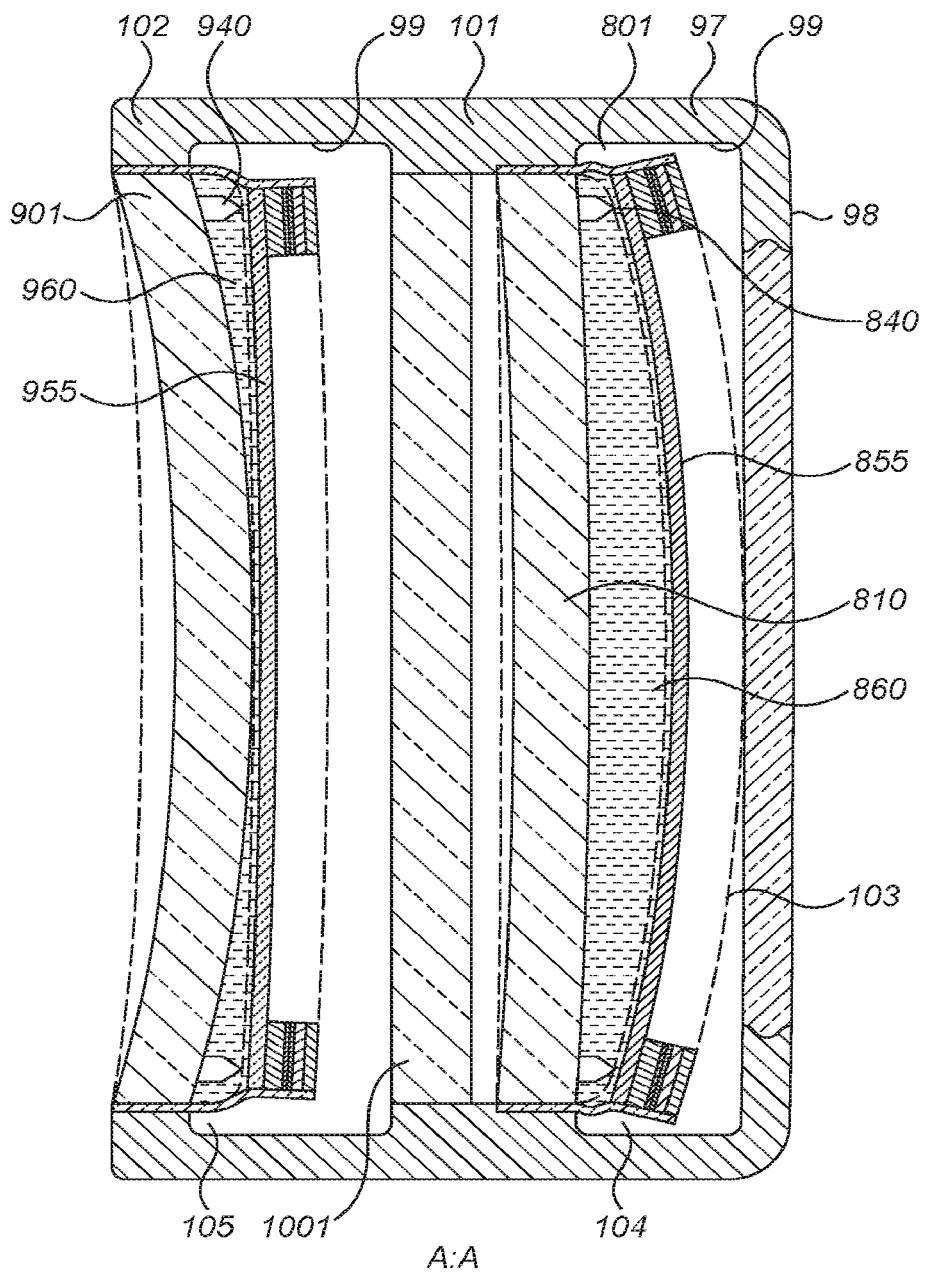
FIG. 39 is another cross-sectional side view on the line A-A of FIG. 37 but differs from FIG. 38 in that in FIG. 39, the front lens assembly is shown actuated to its most positive focusing power, while the rear lens assembly is shown actuated to its most negative focusing power.

As with the lens assemblies 100 that are incorporated in the pair of eyeglasses 10 of Example 1 above, the AR modules 800 of the present embodiment are non-round and are provided in left and right versions that are mirror images of one as shown in FIG. 37. FIGS. 38 and 39 are cross-sectional views of the right AR module 800 on the line A-A of FIG. 37. However, the following description applies equally to the left AR module 800.

Each AR module 800 comprises two variable focusing power lens assemblies 801, 901, one disposed in front of the other, as shown in FIGS. 38 and 39, and an electronic control system (not shown). A transparent waveguide display 1001 is interposed between the two lens assemblies 801, 901.

The waveguide display 1001 is arranged to relay a nominally collimated image from a projector (not shown) into the sight path of the user's eye in a manner that is well known in the field of augmented or virtual reality systems. Accordingly, the waveguide display 1001 that forms part of the display module 800 is operably connected to a projector for receiving such a collimated image. The precise details of this are beyond the scope of this invention and are not described in more detail herein. It will be understood that each of the two display modules 800 includes such a waveguide display 1001, allowing a virtual three-dimensional stereoscopic image—which may be static or may be a moving—to be displayed to the user.

The two lens assemblies 801, 901 thus form a front lens assembly 801 and a rear lens assembly 901, as shown in FIGS. 38 and 39. The user is able to view real objects in his or her surroundings through each display module 800, with light passing through the front and rear lens assemblies 801, 901 of each module, and through the interposed waveguide display 1001. The user thus sees the virtual image conveyed by light emitted from the waveguide display 1001 superimposed on his or her view of the real world in front of the front lens 801.

Each of the front and rear lens assemblies 801, 901 has a basic structure that is similar to the structure of the lens assembly 100 described in Example 1 above to provide variable focusing power. Parts of the front and rear lens assemblies 801, 901 that have counterparts in the lens assembly 100 of Example 1 are labelled with similar reference numerals, prefixed by the number "8" or "9" respectively, instead of "1" and need not be described again in detail here. Similar materials and methods to those used for constructing the lens assembly 100 of Example 1 may be employed for making the front and rear lens assemblies 801, 901 of the present embodiment.

Thus, each of the front and rear lens assemblies 801, 901 comprises a hard lens 810, 910. A difference between the front and rear lens assemblies 801, 901 of the present embodiment and the lens assembly 100 of Example 1 is that, in the present embodiment, the hard lens 810, 910 of each of the front and rear lens assemblies 801, 901 is a rear lens positioned behind a distensible elastic membrane 855, 955, as described in more detail below, instead of a front lens.

Figure 40:
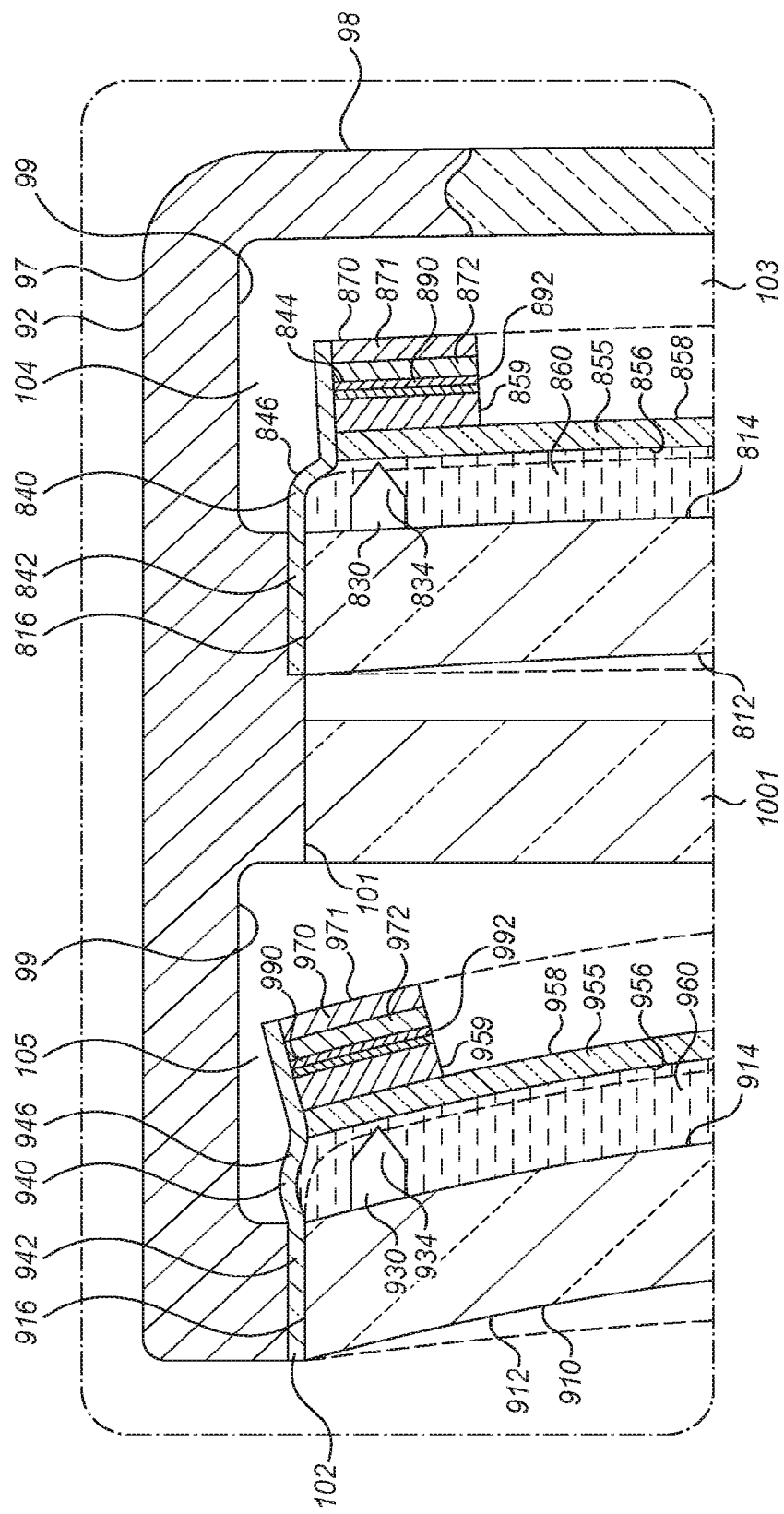
FIG. 40 is an enlarged view of part of FIG. 38.

The rear lens 810, 910 has a rear face 812, 912, a front face 814, 914 and a peripheral side surface 816, 916. A flexible side wall 840, 940 is bonded to the side surface 816, 916 of the rear lens 810, 910, and the elastic membrane 855, 955, which is held at a line tension (of above about 180-200 Nm$^{-1}$) around its edge by a resiliently bendable support ring 859, 959, is attached to a forward end 844, 944 of the side wall 840, 940. In the present embodiment, the support ring 859, 959 comprises only a single ring element which is bonded to a front face 858, 958 of the membrane 855, 955 as best shown in FIG. 40.

The rear surfaces 812, 912 of the rear lenses 810, 910 of the front and rear lens assemblies 801, 901 have different fixed optical powers. The rear surface 812 of the hard lens 810 of the front lens assembly 801 has an optical power of −0.5 dioptres, while the rear surface 912 of the hard lens 910 of the rear lens assembly 901 has an optical power of −3.0 dioptres. These optical powers may be varied in other embodiments of the invention as desired by those skilled in the art.

The front face 814, 914 of the rear lens 810, 910 of each lens assembly 801, 901 defines a sealed envelope with its respective membrane 855, 955 and a collapsible intermediate region 846, 946 of the peripheral side wall 840, 940. As in the lens assembly 100 of Example 1, the envelope is filled with an optically clear, sensibly incompressible, refractive fluid 860, 960.

As described in Example 1 above, a plurality of forwardly extending support pins 830, 930 are fixedly secured to the front face 814, 914 of the rear lens 810, 910 close to the edge of the rear lens 810, 910. Each support pin 830, 930 has a forward end 834, 934 which is connected to a rear face 856, 956 of the membrane 855, 955 at a hinge point in a peripheral region of the membrane 855, 955 where it overlaps with the support ring 859, 959 for coupling the forward end 834, 934 to the support ring 859, 959 and for datuming the support ring 859, 959 from the front face 814, 914 of the rear lens 812, 912 at the hinge point. Between the hinge points, the support ring 859, 959 is free to bend locally forwards or rearwards away from or towards the rear lens 810, 910.

The support ring 859, 959 carries one or more piezoelectric curvature controllers 870, 970, which are attached to one or more respective discrete regions of the support ring 859, 959 around the support ring 859, 959 as described in relation to Example 1. Each curvature controller 870, 970 comprises two laminated layers of piezoelectric material 871, 872; 971, 972, which are provided with electrical connections for connection to an electronic bus (not shown). As described for Example 1, a plurality of curvature controllers 870, 970 may be provided around the entirety of the support ring 859, 959, or only at one or more sections of the support ring 859, 959. Adjacent curvature controllers 870, 970 may be arranged contiguously or spaced apart. While the curvature controllers 870, 970 of the present embodiment comprise two layers of piezoelectric material 871, 872; 971, 972, it will be understood that in other embodiments, each multi-layer curvature controller may be used that have more than two layers of piezoelectric material.

The curvature controllers 870, 970 may be operated using the electronic control system for altering the focusing power of the front surface 858, 958 of the membrane 855, 955 of each of the front and rear lens assemblies 801, 901 in the range about 0.5 to 3.0 dioptres. This range may be different in different embodiments of the invention. Actuation of the lens assemblies 801, 901 is achieved in the present embodiment using the curvature controllers 870, 970 alone, as described in Example 1, but in other embodiments, additional actuators may be provided such, for example, as one or more linear actuators of the kind described in Example 3 above, for actively displacing the support ring 859, 959 towards or away from the rear lens 810, 910 at one or more actuation points.

Each of the lens assemblies 801, 901 is also provided with one or more curvature sensors 890, 990 which are also carried on the support ring 859, 959 as shown in FIG. 40 and substantially as described in Example 1. As before, the curvature sensors 890, 990 may be attached around substantially the whole of the support ring 859, 959, or only at one or more discrete regions of the support ring 859, 959, for example where there are curvature controllers 870, 970. In the present embodiment, the curvature sensors 890, 990 are interposed between the support ring 859, 959 and the curvature controllers 870, 970 and are separated therefrom by a continuous layer of insulating material 892, 992.

Each of the front and rear lens assemblies 801, 901 may also be provided with a pressure sensor and/or a temperature sensor (not shown) as described in Example 1, but these are optional and are omitted from the drawings of the present embodiment for clarity. The curvature sensors 890, 990 and optional temperature and pressure sensors may be used by the control system as described in Example 1 to control operation of the AR module 800.

It will be understood from the above the in the present embodiment, the composite focusing power of the front lens assembly 801 is adjustable in the range 0-2.5 dioptres, while the composite focusing power of the rear lens assembly 901 is adjustable in the range −2.5-0 dioptres. In some embodiments the front and rear lens assemblies 801, 901 may be capable of different ranges of focusing power.

As shown in FIGS. 38-40, the rim portion 97 of the frame front 92 of the headset 80 has a front bezel portion 98, which overlaps and conceals the support ring 859 of the front lens assembly 801 and the curvature controllers 870 and curvature sensors 890 mounted thereon, and an inner surface 99, which surrounds the aperture 103 in which the AR module 800 is received. The inner surface 99 is shaped to form an intermediate rib 101 and a rear rib 102. The rear lens 810 of the front lens assembly 801 forms a close fit with the inner surface 99 of the rim portion 97 in the region of the intermediate rib 101 and is fixedly secured thereto as best seen in FIG. 40, with a rear end portion 842 of the flexible side wall 840 trapped between the peripheral side wall 816 of the rear lens 810 and the intermediate rib 101, such that the collapsible intermediate portion 846 of the side wall 840 protrudes forwardly of the intermediate rib 101 into a front enlarged region 104 of the aperture 103 such that the support ring 859 is capable of moving towards and away from the rear lens 810 without touching the inner surface 99 of the rim portion 97.

In a similar manner, the rear lens 910 of the rear lens assembly 901 forms a close fit and is fixedly secured to the inner surface 99 of the rim portion 97 in the region of the rear rib 102, with a rear end portion 942 of the flexible side wall 940 being trapped between the peripheral side wall 916 of the rear lens 910 and the rear rib 102, and the intermediate portion 946 of the side wall 940 protecting forwards into a rear enlarged region 105 of the aperture 103 such that the support ring 955 of the rear lens assembly 901 is able to move towards or away from its respective rear lens 910 without interfering with the inner surface 99 of the rim portion 97.

The waveguide display 1001 is also shaped to form a close tolerance with the inner surface 99 of the rim portion 97 in the region of the intermediate rib 101 and is fixedly secured thereto by bonding or other suitable means.

In the present embodiment, the AR module 800 is therefore integrated into the frame 90 of the headset 80. However, in other embodiments, the AR module 800 may have its own dedicated housing, which may have a structure similar to the structure of the rim portion 97 described above, but which allows the AR module 800 to be provided as a distinct integrated unit, which can be mounted in a separate frame.

A suitable method of operating the AR module 800 comprising the two variable focusing power lens assemblies 801, 901 in optical alignment with one another is described in detail in co-pending UK patent application no. 1800933.2.

Briefly, the rear lens assembly 901 can be operated to make its composite focusing power more negative, thereby to displace the virtual focal plane of a virtual object conveyed by light emitted from the waveguide 1001 from infinity to a specific focal length. The front lens assembly 801 can be operated to increase its composite focusing power to negate the increased negative focusing power of the rear lens assembly 901, so that the effect on light passing through both lens assemblies 801, 901 of the AR module 800 is substantially neutral. In this way, the AR module 800 can be controlled using, for example, an eye-tracking system as an input device to eliminate or at least alleviate the phenomenon of vergence-accommodation conflict that is associated with prior augmented and virtual reality devices.

In some cases, the front and rear lens assemblies 801, 901 may be operated such that the net focusing power of the AR module is zero, but in other embodiments, the front and rear lens assemblies 801, 901 may be operated to provide a net negative (or positive) focusing power according to a user's optical prescription, i.e. for correcting refractory errors. In some embodiments, adjustment of the front and rear lens assemblies 801, 901 may also take account of a user's presbyopia such that when viewing near virtual objects, the rear lens assembly 901 may have a less negative focusing power than when the user is not presbyopic. When viewing near real objects, the front and rear lens assemblies 801, 901 may be adjusted to provide a more positive overall focusing power.

The present invention therefore also provides an augmented reality display module 800 comprising two variable focusing power lens assemblies 801, 901 arranged one in front of the other with an optically clear waveguide display 1001 interposed between them. Each of the variable focusing power lens assemblies 801, 901 comprises an optically clear, distensible membrane 855, 955 which is held at a line tension of at least 180 $Nm^{-1}$ by a bendable, peripheral support ring 859, 959. One or more curvature controllers 870, 970 such, for example, as piezoelectric bending actuators are attached to the support ring 859, 959 for controlling the local curvature of one or more discrete regions of the support ring for controlling the focusing power of the lens assembly 801, 901 and for ensuring that the membrane 855, 955 distends in a spherical or nearly spherical form defined by one or more Zernike polynomials when actuated. The operation of the curvature controllers 870, 970 may be itself controlled using one or more curvature sensors 890, 990 placed around the support ring.

In some embodiments, the support ring 859, 959 may be supported off an opposing surface 814, 914 of a hard lens 810, 910 by means of a plurality of support pins 830, 930 that protrude from the surface 814, 914 of the hard lens 810, 910 to contact the support ring 859, 959, the ends 834, 934 of the support pins 830, 930 that contact the membrane 855, 955 all lying in a common plane and forming hinge points where the support ring 859, 959 is not required to move towards or away from the surface 814, 914 of the hard lens 810, 910 with changes of focusing power, and the support ring 859, 959 bends locally between the support pins 830, 930.

The invention claimed is:

1. A membrane assembly for a variable focusing power optical device comprising a distensible membrane that is held under tension around its periphery by at least one bendable membrane support ring and one or more bending actuators; wherein the support ring defines an (x,y)-plane in an undeformed state, and the or each bending actuator comprises a selectively operable self-bending strip which is attached contiguously to a respective discrete section of the support ring, and wherein the strip is operable to bend itself to impart bending to the respective discrete section of the support ring, thereby to control the curvature of the respective discrete section of the support ring in a plane defined by a z-axis that is normal to the (x,y)-plane of the support ring and tangential to the periphery of the membrane.

2. The membrane assembly as claimed in claim 1, wherein the strip comprises at least one strip of a piezoelectric, electroactive or magnetostrictive material, a plurality of layers of piezoelectric material and/or at least one bimetallic strip.

3. The membrane assembly as claimed in claim 1, further comprising at least one curvature sensor for measuring the local curvature of a discrete section of the ring.

4. A variable focusing power optical assembly comprising a membrane assembly as claimed in claim 1.

5. A variable focusing power optical assembly comprising a compressible fluid-filled envelope having a first wall formed by a distensible membrane that is held under tension around its periphery by at least one bendable support ring, an inflexible second wall opposite the first wall, the support ring being held at a fixed distance from the second wall at three or more hinge points which are spaced apart around the support ring, and being bendable towards or away from the second wall intermediate the hinge points, and a side wall between the first and second walls that is collapsible to accommodate such bending, and one or more bending actuators, wherein the or each bending actuator comprises a selectively operable self-bending strip which is attached contiguously to a respective discrete section of the support ring between the hinge points; wherein the membrane is arranged to distend in a direction towards or away from the second wall upon bending of the support ring between the hinge points, a surface of the membrane forming an optical surface having variable focusing power owing to such distension, and the or each bending actuator is operable to bend itself to impart bending to the respective discrete section of the support ring, thereby to control the curvature of each respective discrete section of the support ring in a direction parallel to an optical axis of the optical assembly and tangential to the periphery of the membrane.

6. The variable focusing power optical assembly as claimed in claim 5, wherein the second wall is formed by or supported on a surface of a rigid body that is mounted firmly to a chassis structure and the support ring engages the chassis structure at each of the hinge points.

7. The variable focusing power optical assembly as claimed in claim 5, wherein the second wall is formed by or supported on a surface of a rigid body, and the support ring is mounted to the rigid body by a support pin at each hinge point, each support pin having a first end that contacts the support ring and a second end that is fixedly secured to the rigid body.

8. The variable focusing power optical assembly as claimed in claim 5, further comprising at least one boundary height controller for actively displacing a section of the support ring between two hinge points towards or away from the second wall.

9. The variable focusing power optical assembly as claimed in claim 5, wherein the strip comprises at least one strip of a piezoelectric, electroactive or magnetostrictive material, a plurality of layers of piezoelectric material and/or at least one bimetallic strip.

10. The variable focusing power optical assembly as claimed in claim 5, comprising two or more bending actuators that are attached to different respective discrete sections of the support ring.

11. The variable focusing power optical assembly as claimed in claim 5, further comprising at least one curvature sensor for measuring the curvature of a discrete section of the support ring and generating an output signal representing the curvature of the discrete section.

12. The variable focusing power optical assembly as claimed in claim 11, further comprising an electronic control system for controlling operation of the one or more bending actuators; the electronic control system comprising a processor, a memory containing machine-readable instructions and data relating the curvature of the discrete section of the support ring measured by the curvature sensor to the focusing power of the optical surface formed by the membrane, and an input device operable to generate an input signal representing a value related to a target focusing power; wherein the machine-readable instructions include instructions for the processor to receive the output signal from the curvature sensor and use the data to determine a measured focusing power of the optical surface of the membrane, receive the input signal from the input device and determine the target focusing power, compare the measured focusing power of the optical surface with the target focusing power and, if the measured focusing power is different from the target focusing power, to operate the or each bending actuator to change the curvature of the respective discrete section of the support ring, thereby to adjust the focusing power of the optical surface towards to the target focusing power.

13. The variable focusing power optical assembly as claimed in claim 12, further comprising at least one further sensor for measuring a physical property of the fluid within the fluid-filled envelope; wherein the data relates the focusing power of the optical surface to the curvature of the discrete section of the support ring measured by the curvature sensor and the physical property of the fluid, and the machine-readable instructions include instructions for the processor to receive a sensor signal from the further sensor and to calculate the measured focusing power of the optical surface from the measured curvature of the discrete section of the support ring and the measured physical property of the fluid.

14. The variable focusing power optical assembly as claimed in claim 12, wherein the input device is a user-operable input device for setting the target focusing power.

15. The variable focusing power optical assembly as claimed in claim 12, wherein the input device comprises a range-finding device or an eye-tracking device.

16. The variable focusing power optical assembly as claimed in claim 12, which comprises at least one boundary height controller for actively displacing the support ring at an actuation point between two hinge points towards or away from the second wall; wherein the data includes data relating the focusing power of the optical surface to the displacement or position of the actuation point and the curvature of the discrete section of the support ring, and the machine-readable instructions include instructions for the processor to operate the boundary height controller to adjust the displacement or position of the support ring at the actuation point and to operate the or each bending actuators to adjust the curvature of the respective discrete section of the support ring, thereby to adjust the focusing power of the optical surface towards to the target focusing power.

17. An article of eyewear comprising at least one variable focusing power optical assembly as claimed in claim 5.

18. A variable focusing power optical assembly comprising a compressible fluid-filled envelope having a first wall formed by a distensible membrane having a surface that forms an optical surface, the membrane being held under tension around its periphery by at least one bendable support ring, an inflexible second wall opposite the first wall which is formed by or supported on a first surface of a rigid body, and a collapsible side wall extending between the first and second walls, the support ring being mounted on the rigid body by a plurality of support pins, each support pin having a first end attached to the support ring at a respective hinge point and a second end fixedly secured to the rigid body, such that the support ring is held at a fixed distance from the second wall at each hinge point by the corresponding support pin and is bendable towards or away from the second wall intermediate the hinge points, and at least one selectively operable pressure adjuster for adjusting the pressure of the fluid in the envelope to cause the membrane to distend towards or away from the second wall such that the optical surface formed by the membrane is of variable focusing power.

19. The variable focusing power optical assembly as claimed in claim 18, wherein each support pin extends between the support ring and the second wall in a direction substantially parallel to the direction of distension of the membrane.

20. The variable focusing power optical assembly as claimed in claim 18, wherein the hinge points lie in a same plane.

21. The variable focusing power optical assembly as claimed in claim 18, wherein the pressure adjuster comprises a boundary height controller which is operable for actively displacing the support ring at an actuation point between two hinge points towards or away from the second wall.

22. An article of eyewear comprising at least one variable focusing power optical assembly as claimed in claim 18.

* * * * *